(12) United States Patent
Aubert

(10) Patent No.: US 12,458,715 B2
(45) Date of Patent: ***Nov. 4, 2025

(54) ULTRA-VIOLET A (UVA) AND ULTRA-VIOLET C (UVC) SYSTEM AND METHODS FOR INACTIVATION, REDUCTION AND INHIBITION OF GROWTH OF CORONAVIRUS

(71) Applicants: 2449049 ONTARIO INC., Mississauga (CA); HELIOS SHIELD LTD, London (GB)

(72) Inventor: Andrew Clark Baird Aubert, Waterdown (CA)

(73) Assignee: Helios Shield Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/299,378

(22) PCT Filed: Apr. 20, 2021

(86) PCT No.: PCT/CA2021/050543
§ 371 (c)(1),
(2) Date: Jun. 3, 2021

(87) PCT Pub. No.: WO2021/223012
PCT Pub. Date: Nov. 11, 2021

(65) Prior Publication Data
US 2023/0063654 A1    Mar. 2, 2023

Related U.S. Application Data

(63) Continuation-in-part of application No. 16/984,366, filed on Aug. 4, 2020, now Pat. No. 12,409,245.
(Continued)

(30) Foreign Application Priority Data

Jul. 31, 2020  (WO) ................ PCT/CA2020/051059

(51) Int. Cl.
A61L 2/10    (2006.01)
A61L 2/24    (2006.01)

(52) U.S. Cl.
CPC ................... *A61L 2/10* (2013.01); *A61L 2/24* (2013.01); *A61L 2202/11* (2013.01)

(58) Field of Classification Search
CPC ................... A61L 2/10; A61L 2/24
See application file for complete search history.

(56) References Cited

U.S. PATENT DOCUMENTS

| 5,144,146 A | 9/1992 | Wekhof |
| 6,264,802 B1 | 7/2001 | Kamrukov et al. |

(Continued)

FOREIGN PATENT DOCUMENTS

| CN | 204745051 U | 11/2015 |
| CN | 207196113 U | 4/2018 |

(Continued)

OTHER PUBLICATIONS

Xiao et al., Impact of UVA pre-radiation on UVC disinfection performance: Inactivation, repair and mechanism study Source, https://www.sciencedirect.com/science/article/abs/pii/S0043135418303890,Publication Date: May 15, 2018.

(Continued)

*Primary Examiner* — Donald R Spamer
(74) *Attorney, Agent, or Firm* — Potomac Law Group, PLLC; Joseph F. Murphy

(57) ABSTRACT

A UVA/UVC system for reducing active levels, on a surface, and inhibiting further growth of coronavirus on the surface, wherein the system has no deleterious effects on a human, in particular on a human eye or epidermis and dermis, wherein the system includes:
iv) at least one UVA light source;
v) at least one UVC light source; and (Continued)

Figure 1:
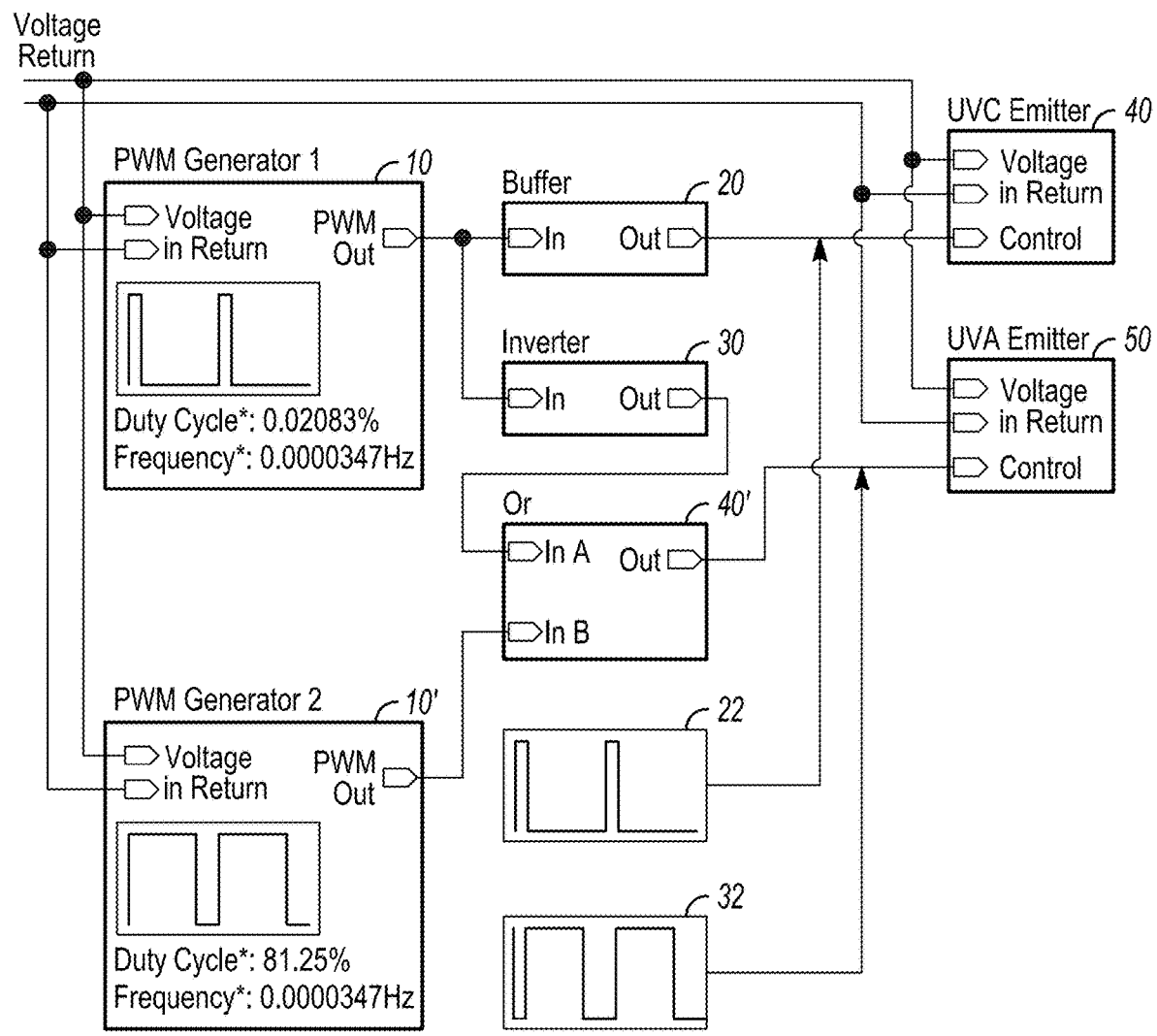
Figure 2:
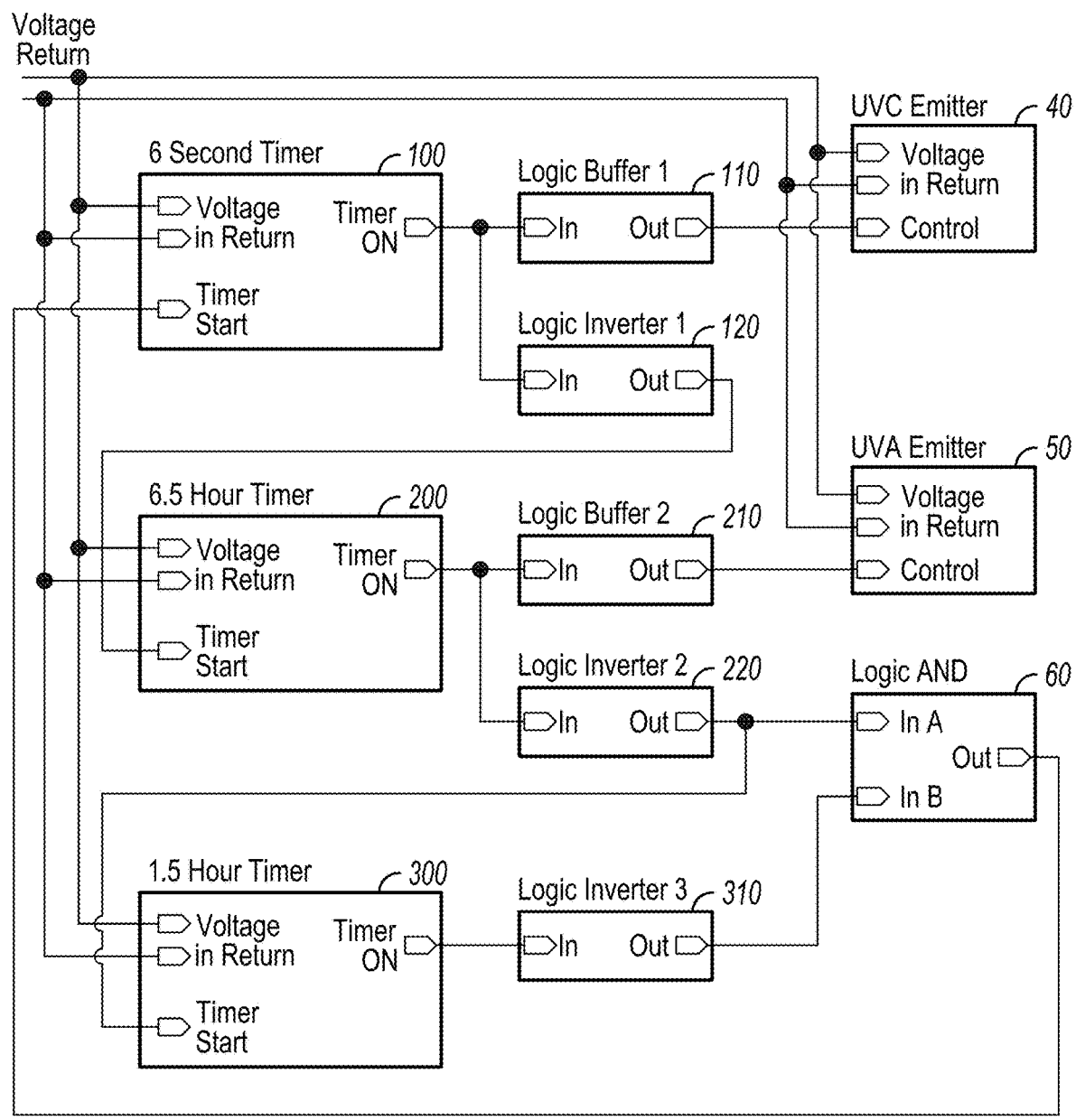

at least one controller connected to each of the at least one UVA light source and the at least one UVC light source, for controlling at least one parameter of each of the UVA light source and UVC light source.

41 Claims, 16 Drawing Sheets

Related U.S. Application Data

(60) Provisional application No. 63/019,534, filed on May 4, 2020, provisional application No. 62/984,360, filed on Mar. 3, 2020.

(56) References Cited

U.S. PATENT DOCUMENTS

| | | | |
|---|---|---|---|
| 6,656,424 | B1 | 12/2003 | Deal |
| 8,324,595 | B2 | 12/2012 | Takahashi et al. |
| 9,039,966 | B2 | 5/2015 | Anderson et al. |
| 9,289,523 | B2 | 3/2016 | Lee |
| 9,839,706 | B2 | 12/2017 | Anderson et al. |
| 9,937,274 | B2 | 4/2018 | Clynne et al. |
| 9,981,052 | B2 | 5/2018 | Clynne et al. |
| 10,117,958 | B2 | 11/2018 | Dombrowsky et al. |
| 10,245,340 | B2 | 4/2019 | Stibich et al. |
| 10,245,341 | B2 | 4/2019 | Stibich et al. |
| 10,357,582 | B1 | 7/2019 | Barron et al. |
| 10,434,202 | B2 | 10/2019 | Hawkins et al. |
| 10,688,211 | B2 | 6/2020 | Barber, III |
| 2007/0053188 | A1 | 3/2007 | New et al. |
| 2009/0252646 | A1* | 10/2009 | Holden ............ A61L 2/10 |
| | | | 422/186.3 |
| 2010/0096306 | A1* | 4/2010 | Chang ............ C02F 1/325 |
| | | | 210/105 |
| 2010/0246169 | A1 | 9/2010 | Anderson et al. |
| 2011/0243789 | A1 | 10/2011 | Roberts |
| 2012/0280147 | A1 | 11/2012 | Douglas |
| 2013/0178921 | A1 | 7/2013 | Rogers |
| 2014/0241941 | A1 | 8/2014 | Kreitenberg |
| 2014/0322073 | A1 | 10/2014 | Link et al. |
| 2016/0339262 | A1 | 11/2016 | Fiset |
| 2017/0173195 | A1 | 6/2017 | Stibich et al. |
| 2017/0246331 | A1* | 8/2017 | Lloyd ............ A61Q 17/04 |
| 2017/0281811 | A1 | 10/2017 | Inskeep |
| 2018/0055959 | A1 | 3/2018 | Lin et al. |
| 2018/0182939 | A1 | 6/2018 | Liu et al. |
| 2018/0193501 | A1 | 7/2018 | Ufkes et al. |
| 2018/0193502 | A1 | 7/2018 | Ufkes |
| 2018/0339073 | A1 | 11/2018 | Clynne et al. |
| 2018/0369560 | A1 | 12/2018 | Ball et al. |
| 2019/0117811 | A1 | 4/2019 | Yoon et al. |
| 2019/0209722 | A1 | 7/2019 | Stibich et al. |
| 2020/0054893 | A1 | 2/2020 | Yoon et al. |
| 2020/0078482 | A1* | 3/2020 | Yoon ............ A61F 13/00051 |

FOREIGN PATENT DOCUMENTS

| | | |
|---|---|---|
| CN | 108644662 A | 10/2018 |
| CN | 209092250 U | 7/2019 |
| CN | 111358977 A | 7/2020 |
| CN | 211096244 U | 7/2020 |
| CN | 111529727 A | 8/2020 |
| EP | 3287146 A1 | 2/2018 |
| JP | 200727553 A | 2/2007 |
| KR | 1020140112163 A | 9/2014 |
| KR | 1020160013504 A | 2/2016 |
| KR | 1020160070195 A | 6/2016 |
| KR | 1020160093832 A | 8/2016 |
| KR | 1020180044532 A | 5/2018 |
| SG | 10201508854 A1 | 5/2016 |
| WO | 20070133537 A2 | 11/2007 |
| WO | 2010047479 A2 | 4/2010 |
| WO | 2011016679 A2 | 2/2011 |
| WO | 2016049143 A2 | 3/2016 |
| WO | 2018021595 A1 | 2/2018 |
| WO | 2018101943 A1 | 6/2018 |
| WO | 2019072205 A1 | 4/2019 |
| WO | 202036471 A1 | 2/2020 |
| WO | 2020036471 A1 | 2/2020 |

OTHER PUBLICATIONS

China GTL Tools, 9 LED Portable UVA+UVC Germicidal Lamp Anti-Bacterial Rate 99.9% Sanitizer UV Lamp for Home Cleaner Disinfection Bacteria, Microbes and Viruses Source: https://youlaite.en.made-in-china.com/product/sZLQqDcTntVy/China-9-LED-Portable-UVA-UVC-Germicidal-Lamp-Anti-Bacterial-Rate-99-9-Sanitizer-UV-Lamp-for-Home-Cleaner-Disinfection-Bacteria-Microbes-and-Viruses.html Publication Date: May 28, 2020.

Chevremont, Multivariate optimization of fecal bioindicator inactivation by coupling UV-A and UV-C LEDs Source: https://www.sciencedirect.com/science/article/abs/pii/S0011916411008678 Publication: Nov. 12, 2011.

International Search Report of PCT/CA2020/051059 dated Nov. 30, 2020.

Song, et al., Microorganisms inactivation by wavelength combinations of ultraviolet light-emitting diodes (UV-LEDS), Science of the Total Environment 665, (2019) 1103-1110.

Abstract of CN111358977A.
Abstract of CN211096244U.
Abstract of CN111529727A.
English-language abstract of CN108644662.
English-language abstract of CN 204745051.
English-language abstract of CN 207196113.
English-language abstract of CN 209092250.
English-language abstract of JP 2007027553.
English-language abstract of KR 2014011263.
English-language abstract of KR 20160013504.
English-language abstract of KR 20160070195.
English-language abstract of KR 20160093832.
English-language abstract of KR 20180044536.

International Search Report for PCT/CA2021/050543 mailed Jul. 21, 2021.

IES Photobiology Committee, "IES Committee Report: Germicidal Ultraviolet (GUV)—Frequently Asked Questions" Apr. 15, 2020, https:www.ies.org/standards/committee-reports/ies-committee-report-cr-2-20-faqs/.

LEDRise LED Professional, "Disinfection with UV Light, >99% Kill Rate for Viruses (incl Covid-19) or Bacteria", Mar. 31, 2020, https://www.ledrise.eu/blog/disinfection-with-uv-light/, accessed Aug. 4, 2021.

Eickman, M. et al, "Inactivation of Ebola virus and Middle East respiratory syndrome coronavirus in platelet concentrates and plasma by ultraviolet C light and methylene blue plus visible light, respectively", Transfusion, Sep. 2018, vol. 58, https://onlinelibrary.wiley.com/doi/full/10.1111/trf.14652.

Razzaghi, K. et al, "Role Low-Power Blue Laser With a Wavelength of 405 Nm in Increasing the Level of Nitric Oxide in Increasing the Resistance of Cells to the Virus (Covid-19) and its Effect on Virus (Covid-19) Mortality in Vitro", Apr. 30, 2020, https://www.ospublishers.com/Role-Low-Power-Blue-Laser-With-a-Wavelength-of-405-Nm-in-Increasing-the-Level-of-Nitric-Oxide-in-Increasing-the-Resistance-of-Cells-to-the-Virus-(COVID-19)-and-its-Effect-on-Virus-(COVID-19)-Mortality-in-Vitro.html.

Akerman, E., "Autonomous Robots Are Helping Kill Coronavirus in Hospitals", Mar. 11, 2020, https://spectrum.ieee.org/automation/robotics/medical-robots/autonomous-robots-are-helping-kill-coronavirus-in-hospitals.amp.html.

Fernandez, Sonia, "Ultraviolet LEDs prove effective in eliminating coronavirus from surfaces and potentially, air and water", University of California-Santa Barbara, Apr. 14, 2020, https://www.sciencedaily.com/releases/2020/200414173251.htm.

Written Opinion of the International Preliminary Examining Authority issued in PCT/CA2020/051059 mailed Mar. 1, 2022.

(56) References Cited

OTHER PUBLICATIONS

American National Standard ANSI/IES RP-44-21 Recommended Practice: Ultraviolet Germicidal Irradiation (UVGI). Jul. 2021.
Directive 2006/25/EC of the European Parliament and of the Council. Apr. 5, 2006.
Office Action for Canadian Patent Application No. 3,172,386 issued on Nov. 21, 2023.
SeoulViosys. 3528-CUNOLF1B May 9, 2018.
Supplementary European Search Report for European Application No. 20922533.3 dated Mar. 14, 2024.
UCAR Center for Science Education. Ultraviolet (UV) Radiation. 2017.

* cited by examiner

ULTRA-VIOLET A (UVA) AND ULTRA-VIOLET C (UVC) SYSTEM AND METHODS FOR INACTIVATION, REDUCTION AND INHIBITION OF GROWTH OF CORONAVIRUS

FIELD OF THE DISCLOSURE

This disclosure relates to a system and method of inactivating, reducing and inhibiting growth of coronavirus, in public areas such as areas frequented by humans in public transit vehicles and the like, by the use of UVA and UVC light sources at levels detrimental to coronavirus but safe for animals, including mammals and humans.

BACKGROUND

Seven coronaviruses can infect humans such as human coronavirus (HCoV) called HCoV-229E, HCoV-OC43, HCoV-HKU1, HCoV-NL63, Middle East respiratory syndrome coronavirus (MERS-CoV), severe acute respiratory syndrome coronavirus (SARS-CoV and SARS-CoV-2). The first human coronavirus (HCoV) strain called B814 was isolated from the nasal discharge of a patient with a common cold in 1965. More than 30 additional strains were subsequently identified including HCoV-229E that was named so after a student specimen coded 229E. HCoV-229E was isolated by using the standard tissue culture method. HCoVs including HCoV-299E strain can be responsible for 15%-30% of common cold cases in human adults. However severe respiratory tract infections may also occur in elderly people, infants or immunocompromised patient. Exposure to ultraviolet (UV) light can lead to antimicrobial activity. Far-UV light (for instance, from 207 to 222 nm) may be used as an efficient germicidal approach for killing microorganisms. UVC was found to provide the strongest antimicrobial activity among other types of UV radiation. For instance, it has been reported that far-UVC light (222 nm) inactivated airborne influenza virus. However, the exposure to UVC lamp might be associated with a health risk such as eye and skin damage. Furthermore, UVC and UVB could be absorbed by RNA or DNA molecules and induce photochemical fusion of the adjacent pyrimidines into covalent-linked dimers such as thymine/cytosine dimers in DNA or uracil/cytosine dimers in RNA. UV light may also damage RNA protein cross-linking, energy transfer between two proteins and result in site-specific damage to RNA. UVA can provide oxidative damage to DNA, lead to production of reactive oxygen species and induce membrane damage. However, external UVA (315-400 nm) and UVB (280-315 nm) are approved by FDA to use for the indication of eczema, psoriasis, skin lymphoma. UV light sources are known to be very effective in reducing coronavirus levels on surfaces. However, the typical radiated power and exposure time needed to reduce the levels of coronavirus may be deleterious to human eyes and epidermis and dermis layers.

There is a need for a system which will reduce the level of coronavirus on a surface and inhibit further growth while being safe to human exposure.

SUMMARY

According to one aspect, there is provided an alternating UVA/UVC system for inactivating, reducing and inhibiting further growth, on a surface, of coronavirus, in one alternative, human coronavirus (HCoV-229E), wherein said system has no deleterious effects on an animal, including a human, in particular on a human eye or epidermis and dermis, wherein said system comprises:
  i) at least one UVA light source;
  ii) at least one UVC light source; and
  iii) at least one controller connected to each of said at least one UVA light source and said at least one UVC light source, for controlling at least one parameter of each of said UVA light source and UVC light source selected from light source, light intensity, radiated power level, wavelength, exposure time and combinations thereof; wherein said at least one UVC light source emits UVC light to a surface for a period of time reducing the level of said coronavirus on said surface to a level that is safe to animals including humans, and said at least one UVA light source emits UVA light to a surface for a period of time inhibiting growth of said coronavirus on said surface, such that during the time said at least one UVC light source and said at least one UVA light source is emitting on said surface, radiation levels from said at least one UVC light source and said at least one UVA light source is safe to animals, including humans; wherein when said at least one UVC light source is emitting UVA light to said surface, said at least one UVC light is off, and when said at least one UVA light source is emitting light to said surface, said at least one UVC light source is off; and wherein there is a period of blanking time wherein both said at least one UVC light source and said at least one UVA light source are off, wherein cycling between said at least one UVC light source and said at least one UVA light source and said blanking time is controlled by said at least one controller.

According to one alternative, said at least one UVC light source has an operating wavelength of from about 275 nanometers (nm) to about 295 nm. In one alternative, said at least one UVC light source has an operating wavelength of about 275 nm.

According to one alternative, said at least one UVA light source has an operating wavelength of from about 385 nm to about 405 nm. In one alternative, said at least one UVA light source has an operating wavelength of about 405 nm.

According to yet another alternative, said at least one UVC light source is a light emitting diode (LED).

According to yet another alternative, said at least one UVA light source is a LED.

In one alternative, the at least one controller automatically cycles between emitting light from said at least one UVA light source and from said at least one UVC light source and said blanking time.

In one alternative, said at least one UVC light source has an emission at a power level and time duration to reduce coronavirus levels on a surface exposed to said at least one UVC light source.

In one alternative, the power level is selected to ensure the radiated emission from said at least one UVC light source is at a safe level for human eyes and epidermis and dermis.

In one alternative, the time duration is selected to ensure the radiated emission from said at least one UVC light source is at a safe exposure time for human eyes and epidermis and dermis.

In one alternative, said at least one UVA light source has an emission at a power level to inhibit growth of coronavirus on a surface exposed to said at least one UVC light source, while safe for human eyes and epidermis and dermis, regardless of the exposure time.

In one alternative, said at least one UVC light source has a power rating of from about 10 mW to about 100 W. In one alternative, said at least one UVC light source has a power rating of 236 mW.

In one alternative, said at least one UVA light source has a power rating of from about 10 mW to about 100 W. In one alternative, said at least one UVA light source has a power rating of 74 mW.

In one alternative, said system reduces the level of active coronavirus on a surface exposed to said system by 1 to about 100%. In one alternative, by 10 to about 20%.

In yet another alternative, there is provided a method of inactivating, reducing levels, on a surface, and inhibiting further growth of coronavirus, on said surface, wherein said method has no deleterious effects on an animal, including a human, in particular on a human eye or epidermis and dermis, wherein said method comprises:
  i) Exposing said surface to at least one UVC light source for a period of time to reduce the level of coronavirus on said surface;
  ii) Terminating the exposure of the at least one UVC light source on said surface;
  iii) Exposing said UVC exposed surface to at least one UVA light source for a period of time to inhibit growth of said coronavirus on said surface;
  iv) Terminate the exposure of the at least one UVA light source on said surface;
  v) Providing a period of blanking time wherein said at least one UVA light source and said at least one UVC light source are off;
  vi) Optionally repeating steps i) to v) in order to maintain a desired level of the coronavirus, on said surface.

In one alternative, said at least one UVC light source has an operating wavelength of from about 275 nanometers (nm) to about 295 nm. In one alternative, said at least one UVC light source has an operating wavelength of about 275 nm.

According to one alternative, said at least one UVA light source has an operating wavelength of from about 385 nm to about 405 nm. In one alternative, said at least one UVA light source has an operating wavelength of about 405 nm.

According to yet another alternative, said at least one UVC light source is a light emitting diode (LED).

According to yet another alternative, said at least one UVA light source is a LED.

In one alternative, steps i) to v) are controlled by at least one controller automatically cycling between emitting light from said at least one UVA light source and from said at least one UVC light source and providing said blanking time.

In one alternative, said at least one UVC light source has an emission at a power level and time duration to reduce coronavirus on a surface exposed to said at least one UVC light source.

In one alternative, the power level is selected to ensure the radiated emission from said at least one UVC light source is at a safe level for human eyes and epidermis and dermis.

In one alternative, the time duration is selected to ensure the radiated emission from said at least one UVC light source is at a safe exposure time for human eyes and epidermis and dermis.

In one alternative, said at least one UVA light source has an emission at a power level to inhibit growth of coronavirus on a surface exposed to said at least one UVC light source, while safe for human eyes and epidermis and dermis, regardless of the exposure time.

In one alternative, said at least one UVC light source has a power rating of from about 10 mW to about 100 W. In one alternative, said at least one UVC light source has a power rating of 236 mW.

In one alternative, said at least one UVA light source has a power rating of from about 10 mW to about 100 W. In one alternative, said at least one UVA light source has a power rating of 74 mW.

In one alternative, said method reduces the level, and in another alternative inhibits growth, of active coronavirus on a surface by 1 to 100%. In one alternative, by at least one of the following ranges: 10 to 20%, 20 to 30%, 30 to 40%, 40 to 50%, 50 to 60%, 60 to 70%, 70 to 80%, 80 to 90% and 90 to 100%.

In one alternative, said method includes said at least one UVC light source is on for about 6 seconds, then off and followed immediately by at least one UVA light source on for about 6.5 hours, then both said at least one UVC light source and said at least one UVA light source off for about 1.5 hours for a blanking period before recommencing cycling of UVC and UVA light exposure, as required.

In one alternative, the UVA light source may remain on at levels safe to animals including humans to inhibit coronavirus growth and UVC is turned on at intervals to reduce coronavirus levels should coronavirus growth inhibition meet its limit, if any.

In yet another alternative, said system and method with blanking intervals are considered Risk exempt when tested to the IEC 62471 standard.

Herein the term coronavirus may include HCoV-229E.

Herein the term surface includes surfaces typically found in public places such as bathrooms and kitchens, including but not limited to countertops, hard counters, wood counters, concrete, plastic, rubber, leather, material and the like.

BRIEF DESCRIPTION OF THE FIGURES

FIG. 1 is a block diagram of the system, according to one alternative.

FIG. 2 is a block diagram of the system, according to another alternative.

FIG. 3*a* is a schematic of the setup for Example 1

FIG. 3*b* is a photograph of the interior of the setup for Example 1.

FIG. 4 is a schematic representation of the serial dilution carried out for Example 1.

FIG. 5 depicts Non-infected (left) and infected (right) with HCoV-229E MRC-5 cells of Example 1.

FIG. 6 depicts the effect of UVA and UVC light on infectivity of HCoV-229E in 96-well plate of Example 1 following protocol 1.

FIG. 7 Percentage of infected MRC-5 cells after 0, 1 and 3 cycles using protocol 1 in 96-well plate of Example 1 following protocol 1.

FIG. 8 Effect of UVA and UVC light on infectivity of HCoV-229E in 96-well plate following protocol 2.

FIG. 9 Percentage of infected MRC-5 cells after 0, 1 and 3 cycles in 96-well plate following protocol 2.

FIG. 10 Effect of UVA and UVC light on infectivity of HCoV-229E in 96-well plate following protocol 2a.

FIG. 11 Percentage of infected MRC-5 cells after 0, 1 and 3 cycles in 96-well plate following protocol 2a.

FIG. 12 Effect of protocol 1, 2 and 2a on infectivity of HCoV-229E in 96-well plate.

FIG. 13 depicts images showing MRC-5 cells at different experimental stages: non-infected control (a), infected cells with HCoV-229E before UV treatment (b), infected cells after 1 cycle of UV treatment (c) and infected cells after 3 cycles of UV treatment (d) using protocol 2a.

Figure 14:
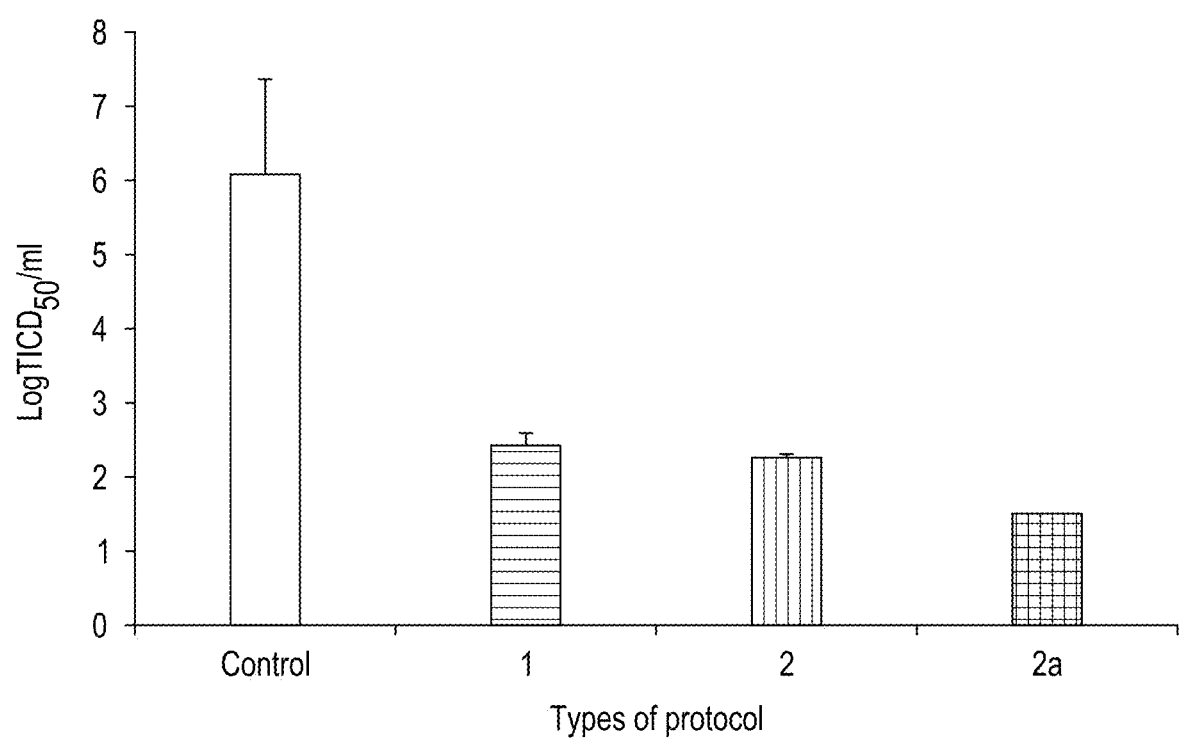

FIG. 14 Effect of protocol 1, 2 and 2a on infectivity of HCoV-229E in 24-well plate. Control is considered as "0 cycles". Data shown represent mean of two independent experiments with error bars of standard deviation. Control was compared to treatments with P-values being <0.5, >0.1 and <0.01 for protocol 1, 2 and 2a, respectively.

Figure 15:
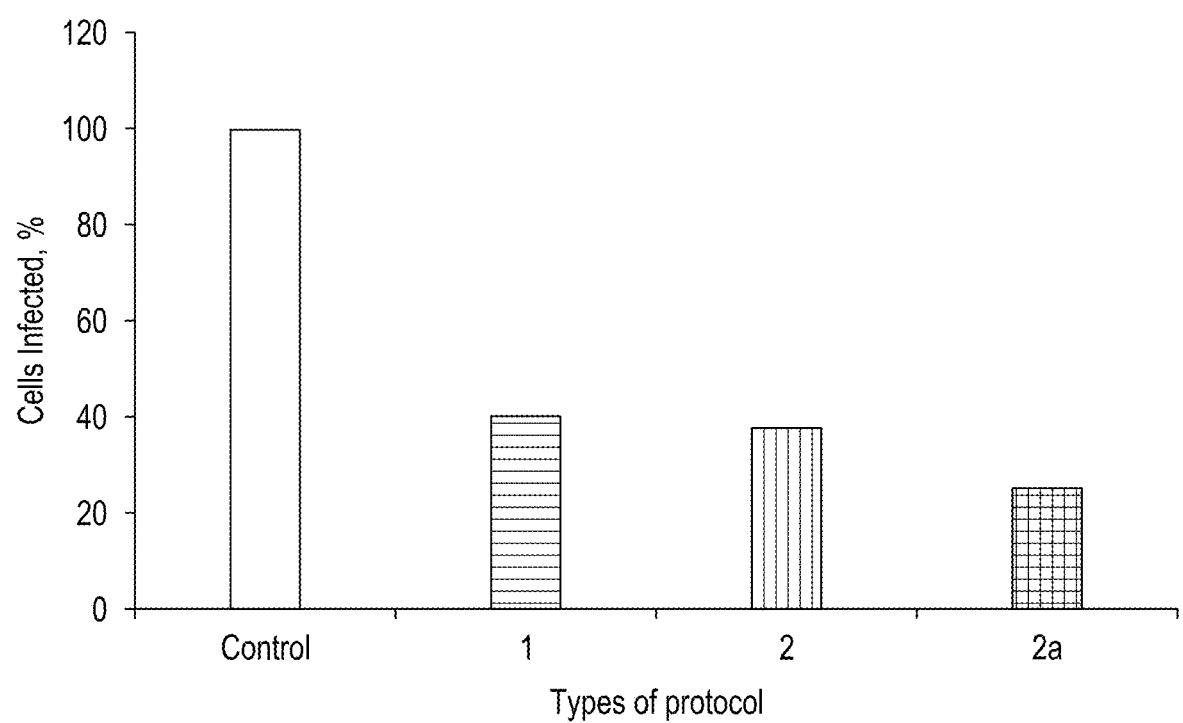

FIG. 15 Effect of protocol 1, 2 and 2a on infectivity of HCoV-229E in 24-well plate. Control is considered as "0 cycles".

DETAILED DESCRIPTION

Referring now to FIG. 1, there is depicted a block diagram of a two continuous Pulse Width Modulation (PWM) example of one alternative for the system described herein. A PWM generator 10 generates a continuous PWM which feeds into two circuits 20 and 30. The first circuit is an optional logic buffer circuit 20 for controlling the pulsing of the UVC emitter 40. The logic buffer circuit 20 ensures that the UVC emitter 40 is emitting when the PWM generator 10 is outputting a high logic level, and off when the PWM generator 10 is outputting a low logic level. See the output curve 22. The second circuit is a logic inverter 30 which feeds into an OR circuit 40', along with the output of the second PWM generator 10', wherein the output of the OR circuit 40' controls the UVA emitter 50, ensuring that the UVA emitter is off when the PWM generator 10' is outputting a high logic level, and UVA emitter is on when the PWM generator 10' is outputting a low logic level. See the inverted output curve 32.

Referring now to FIG. 2, there is depicted a block diagram of a three timer controlled system, according to one alternative. In this example, there is a UVC timer circuit 100, a UVA timer circuit 200 each controlling the UVC emitter 40 and UVA emitter 50 respectively, and a blanking timer circuit 300 for controlling the blanking period. The UVC timer circuit 100 is set for 6 seconds on and the UVA timer circuit 200 is set for 6.5 hours and the blanking timer circuit 300 is set for 1.5 hours. During start up, the UVC timer circuit 100 is enabled and outputs a logic high which is fed into a first logic buffer 110 and first logic inverter 120. The first logic buffer 110 controls the UVC emitter 40 to be on with a high logic output and the UVC emitter 40 to be off with a low logic output, while the first logic inverter 120 is used to ensure the UVA timer circuit 200 is off. Once the UVC timer circuit 100 completes the 6 seconds, the output changes state to turn off the UVC emitter 40 and turn on the UVA timer circuit 200 for 6.5 hours. Once enabled, UVA timer circuit 200 outputs a logic high which is fed into a second logic buffer 210 and second logic inverter 220. The second logic buffer 210 controls the UVA emitter 50 to be on, while the second logic inverter 220 is used to ensure the UVC timer circuit 100 is off. Once the 6.5 hours is completed, the output changes state to turn off the UVA emitter 50 and turn on the blanking timer circuit 300 which ensures both UVC emitter 40 and UVC emitter 50 remain off for 1.5 hours, and the cycle repeats as required. Once enabled, the 1.5 hour timer circuit 300 outputs a logic high and this output is fed into logic inverter 310 wherein the output of logic inverter 310 is combined with the output of logic inverter 220 and fed into logic AND circuit 60 producing a rising edge of the output of the logic AND circuit 60 which feeds in to the 6 second timer 100 to restart the 6 second timer 100 once the 1.5 hour timer circuit 300 completes the time. The time value of each time may be determined by a variety of factors including, power level of UV light source, size of room, etc.

Example 1 UVA and UVC Effect on Coronavirus

In order to reduce risk associated with the experiments, the UV lamp was located in a sealed light box (See FIGS. 3*a* and 3*b*). Eyes were covered with a UV protective shield and a lab coat was worn at all times during the experiments. Experiments involving Human coronavirus (HCoV-229E) were carried out in a safety level 2 hood. Appropriate risk assessments and Control of Substances Hazardous to Health Regulations (COSHH) forms were completed prior to the experiment.

Materials

MRC-5 (ATCC® CCL-171™) Human fibroblast cells were obtained from American Type Culture Collection and used to multiply HCoV-229E and for subsequent assays. HCoV-229E (ATCC VR-740) was also purchased from American type culture collection. Eagle's Minimum Essential Medium (EMEM) (ATCC® 30-2003™) containing both glucose and L-glutamine was purchased from American Type Culture Collection (ATCC) as well as Dimethylsulfoxide (DMSO) (ATCC® 4-X™). Trypsin-EDTA sterile-filtered solution (0.25%) and surface cell culture, rectangular flasks (CellBIND, 25 $cm^2$) were obtained from Merck Life Science UK Limited. Dimethyl sulfoxide (DMSO) was obtained from ChemCruz. Dulbecco's phosphate-buffered saline (DPBS) was purchased from Sigma Aldrich.

UVA (405 nm and 74 mW and 147 mW) and UVC (275 nm and 236 mW) light equipment was provided by Helios Shield LTD.

Maintenance of MRC-5 Cells (Human Lung Fibroblast Cells)

Short-term frozen storage of the cells at −80° C. was carried out by re-suspending cell pellets produced by centrifugation for 5 minutes at 1200 rpm, in 1 ml of a solution of 900 μl of fetal calf serum (FCS) and 100 μl of dimethyl sulfoxide (DMSO).

Eagle's minimum essential medium (EMEM) (Eagle's minimum essential medium contains Earle's Balanced Salt Solution, nonessential amino acids, 2 mM Glutamine, 1 mM sodium pyruvate, and 1500 mg/L sodium bicarbonate) was used to maintain MRC-5 cells. The medium was supplemented with a mixture of penicillin-streptomycin antibiotic (1% of penicillin streptomycin antibiotic) and FCS (10% of FCS (fetal calf serum) to give a final concentration of 1 vol. % and 10 vol. respectively.

Reviving MRC-5 Cells from Frozen

The MRC-5 Cells were thawed (thawed from freezer to lab room temperature. Limited control. Thawing of frozen cells was performed as follows: a tube containing 1 ml of frozen cells was taken out of the freezer (−80° C.) and left inside a tissue culture hood at room temperature (around 19° C.). Once there was a small bit of ice left in the vial (usually after about a minute), transferred the cell suspension into a centrifuge tube and diluted to 1:10 with EMEM medium, and centrifuged at 1200 rpm for 5 minutes. Pellets were then re-suspended in 1 ml of fresh EMEM medium, diluted to 1:6 with the fresh EMEM medium, and incubated in 25 $cm^2$ tissue culture flasks at 37° C. for up to 72 hours.

Passaging of MRC-5 Cells

The spent EMEM medium from the flasks was discarded. The cells were washed once with sterile DPBS (1 mL of DPBS was added to the flasks shaken and discarded). Then, 1 ml of trypsin was transferred into each flask, and cells were incubated for 5 minutes at 37° C. Once all cells had disassociated from the flask (rounded), 9 ml of fresh EMEM medium was added to the same flask. The cells were centrifuged at 1200 rpm for 5 minutes. Cell pellets were re-suspended into 1 ml of fresh EMEM medium. Further passaging was carried out by diluting cells to 1:6 in fresh medium and incubated at 37° C.

Cells at the passage 4 were used for the subsequent experiments (in other words, from the beginning, we have a first cell line, then multiply 4× to derive generation 4. This generation was then frozen. This procedure was repeated throughout all the tests). If cells were required for experiments, cells were counted using a haemocytometer after centrifugation and re-suspension of cell pellets into 1 ml of fresh EMEM medium, but before the passaging. The cells were seeded into sterile plastic ware at appropriate concentrations, where 1×104 cell/ml was used for experiments in both 96-well plates and 24-well plates, respectively.

Infecting MRC-5 cells with HCoV-229E

Figure 4:
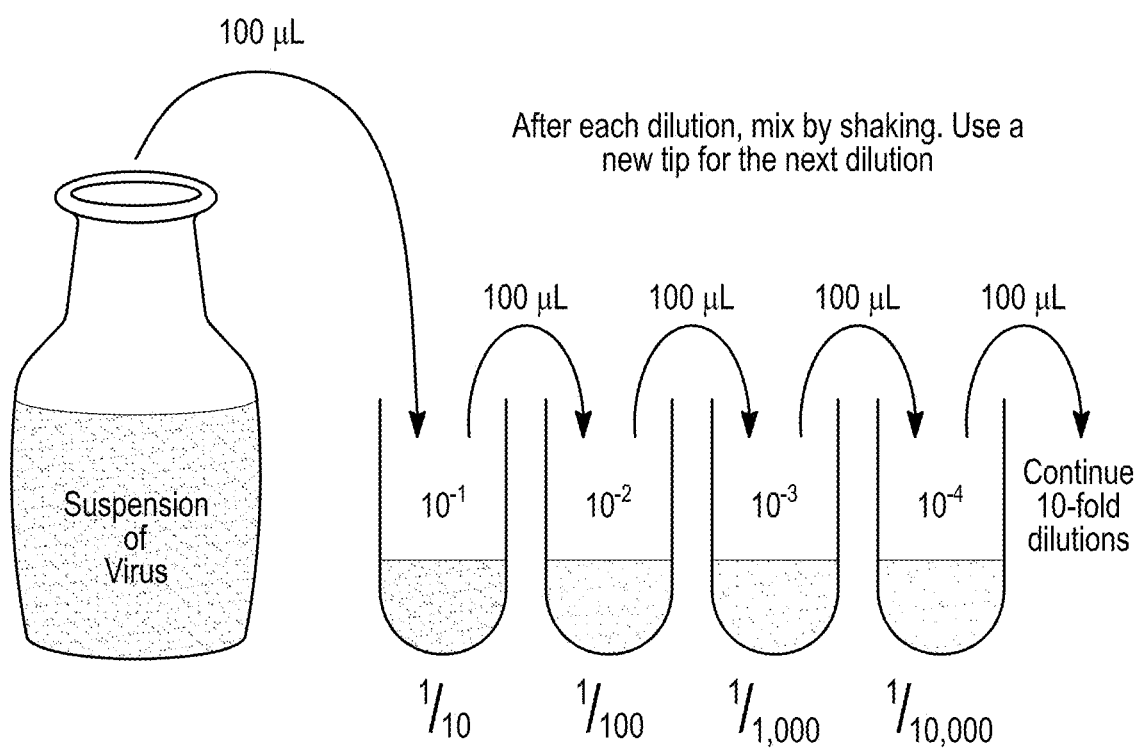

MRC-5 lung fibroblast cells were seeded at a concentration of 1×104 cell/ml into two 24-well plates 48 hours prior to the experiment. The initial purchased stock of HCoV-229E in a volume of 100 µl was serially diluted to $10^{-9}$ in EMEM media (serial dilution is shown in FIG. 4). After 48 hours, once the cells were about 50% confluent, the old medium was replaced with each dilution of HCoV-229E in a fresh medium.

Treatment of Infected Cells Using UV Light

Figure 3A:
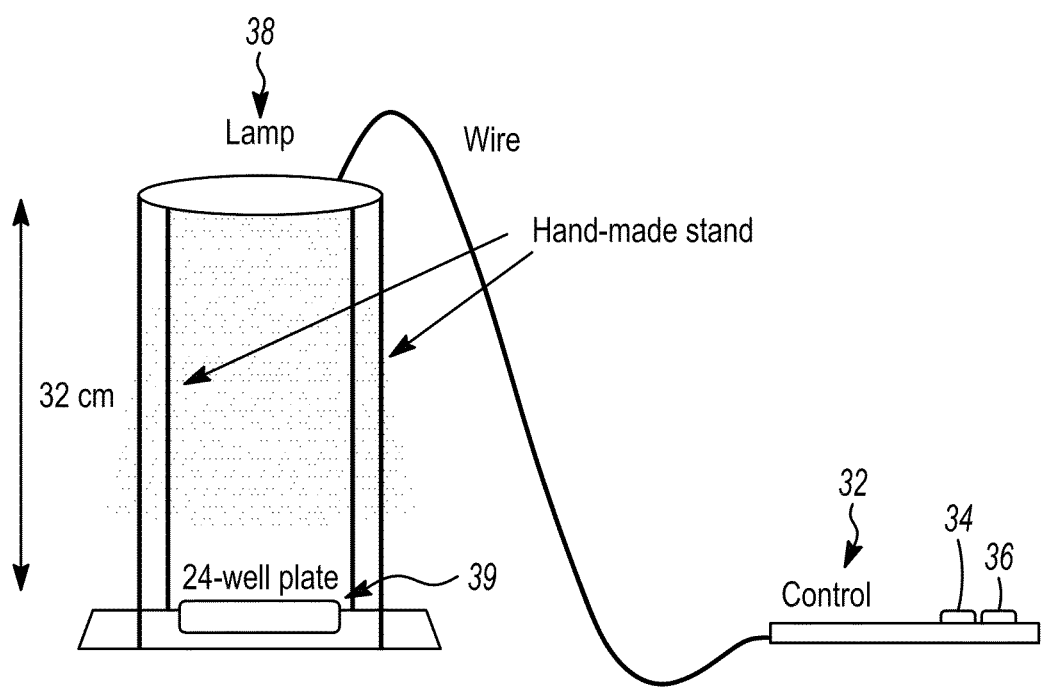
Figure 3B:
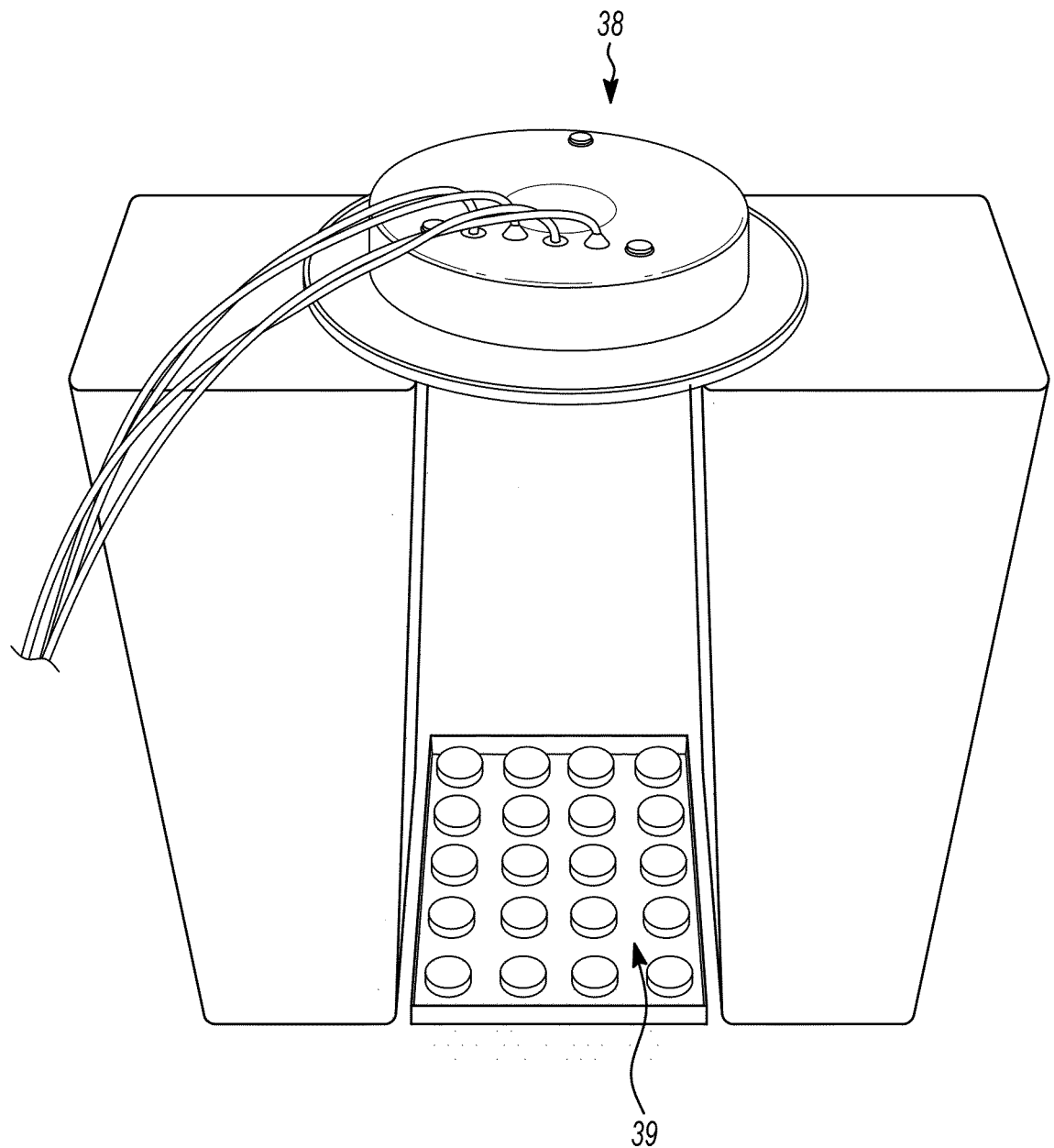

Referring to FIG. 3a, the schematic representation of the experimental set up is shown. The control 32 had two green buttons: the UVA 34 and UVC 36 switches. The UV lamp 38 was placed 32 cm away from the 24-well plate 39 containing infected MRC-5 cells. FIG. 3b is a photograph of the set up during the experiment with the UV lamp 38 and well plate 39.

There were two protocols for treating the infected cells with UVA and UVC light at every 8-hour interval (cycle).

Protocol 1

UVC was activated for 6 seconds at the rotary position "F" (a light power level of 236 mW) and then deactivated. UVA was then immediately activated for 6.5 hours at the rotary position "7" (light power level of 74 mW) and then deactivated. The last 1.5 hours of the 8 hour interval was a blanking time, where both UVA and UVC light is off or deactivated. Such UVC/UVA/blanking interval cycles were repeated up to 11 times. Viral inactivation was analysed after 1, 3, 5, 7, 9, and 11 intervals as described below.

Protocol 2

UVC was activated for 6 seconds at the rotary position "F" (a light power level of 236 mW) and then deactivated. UVA was immediately pulsed (or activated) for 8 hours at the rotary position "F" (a light power level of 147 mW) and then deactivated. There was no blanking time and the UVC/UVA interval cycle was repeated. Such intervals were repeated up to 11 times. Viral inactivation was analysed after 1, 3, 5, 7, 9, and 11 intervals as described in below.

Protocol 2a

UVC was pulsed for 20 seconds at the rotary position "F" (a light power level of 236 mW) and then deactivated. UVA was immediately pulsed for 8 hours at the rotary position "F" (a light power level of 147 mW) and then deactivated). There was no blanking time and the UVC/UVA interval cycle was repeated. Such intervals were repeated up to 11 times. Viral inactivation was analysed after 1, 3, 5, 7, 9, and 11 intervals as described in below.

Detection of Viral Infectivity

After 1, 3, 5, 7, 9, and 11 intervals or cycles, the suspension containing infected cells, released virus and medium was transferred into a cryotube and underwent one rapid cycle of freeze and thaw, where the tube was placed for an hour at −80° C. and subsequently thawed at room temperature for 30 minutes [B.-W. Kong, L. K. Foster and D. N. Foster, "A method for the rapid isolation of virus from cultured cells," BoTechniques, vol. 44, pp. 1-5, 2018]. Then, the suspension was centrifuged at 2000 rpm for 10 minutes to remove cell debris and the culture supernatant. The supernatant was filter-sterilised using a 0.45 µm pore size filter and stored at −80° C. until used for tissue culture infectious dose ($TCID_{50}$) assay.

Analysis of Viral Infectivity Using $TCID_{50}$ Assay

For $TCID_{50}$ assay, HCoV-229E untreated and treated for 1, 3, 5, 7, 9, 11 cycles using either protocol 1 or protocol 2 or 2a was serially diluted in fresh EMEM medium. For serial dilution, 100 µl of virus suspension was placed into 900 µl of the fresh medium that was corresponded to 1:10 dilution or $10^{-1}$ as shown in FIG. 4 as per the protocol in S. E. Grimes, A Basic Laboratory Manual for the Small-Scale Production and Testing of 1-2 Newcastle Disease Vaccine, RAP publications, 2002. Then, 100 µl of virus/medium suspension from $10^{-1}$ was transferred to another tube containing 900 µl of fresh medium and classified as $10^{-2}$ dilution or 1:100. This process was repeated to $10^{-8}$ dilution factor.

MRC-5 cells at a concentration of $1\times10^4$ were seeded into either 96-well plate or 24-well plate. Once, the cells reached approximately 50% of confluence, they were infected with serially diluted treated coronavirus in 5 repeated wells for up to 4 days until cytopathic effect (CPE) was observed. Another plate was incubated with the serially diluted virus without any treatment in order to obtain control for tissue culture infectious dose ($TCID_{50}$) and will be further called 0 cycles.

Once CPE was observed, the number of infected wells were counted. $TCID_{50}$ was calculated using the Reed and Muench method [L. J. Reed and H. Muench, "A simple method of estimating fifty percent endpoints," *American Journal* of Epidemiology, vol. 27, no. 3, pp. 493-497, 1938]. The formula for the calculations is the following (as per Reed and Muench):

log 10 50% endpoint dilution=log 10 of dilution showing a mortality next above 50%−(difference of logarithms×logarithm of dilution factor)

Statistical Analysis

The statistical analysis was calculated using Minitab software and one-way ANOVA test (including Tukey test). P-value less than 0.05 was considered statistically significant.

Modelling for Cross-Contamination Risks

Cross-contamination risk will be calculated using the Exponential model, which represents a "dose-response" relationship between the dose applied to hosts (cells) and the probability of such a host to respond [T. Watanabe, T. A. Bertrand, M. H. Weir, T. Omura and C. N. Haas, "Development of a dose-response model for SARS coronavirus," *Risk Anal, vol.* 30, pp. 1129-1138, 2010].

The following equation was used to calculate cross-contamination: $\rho(i)=1-\exp(-d/k)$ [C. N. Haas, "Microbial Dose Response Modeling: Past, Present, and Future," *Environ. Sci. Technol., vol.* 49, p. 1245-1259, 2015], [T. Watanabe, T. A. Bertrand, M. H. Weir, T. Omura and C. N. Haas, "Development of a dose-response model for SARS coronavirus," *Risk Anal, vol.* 30, pp. 1129-1138, 2010]

Where ρ is the risk of contamination, k represents the probability of a single cell surviving, whereas d is the dose of such cells administered.

Results

Figure 5:
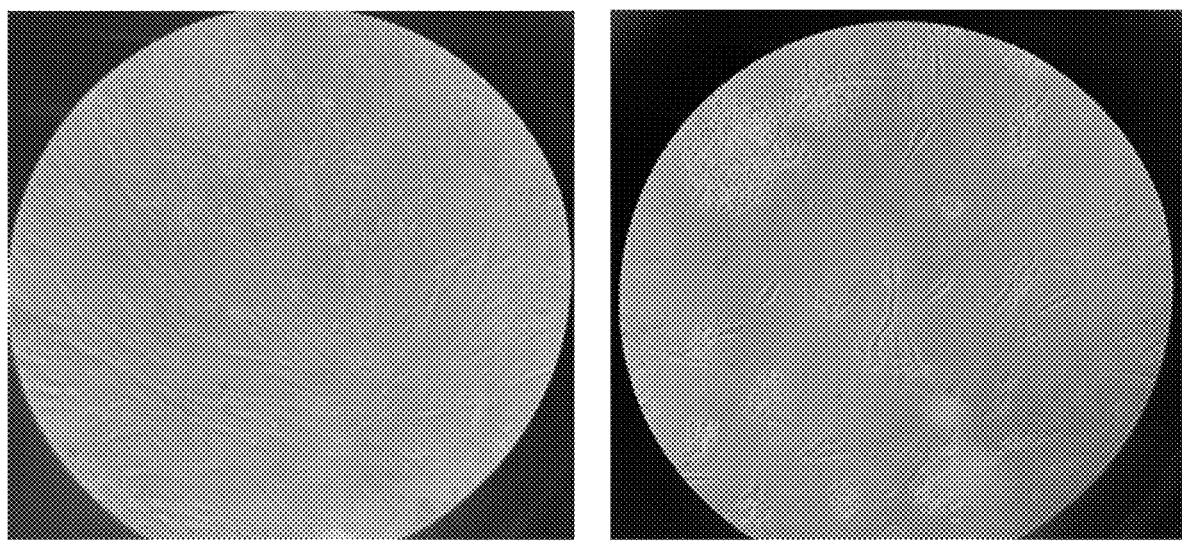

MRC-5 cells were infected with HCoV-229E and treated with UVA and UVC light as described. FIG. 5 illustrates non-infected (left) and infected (right) MRC-5 cells, where CPE could be observed.

Figure 6:
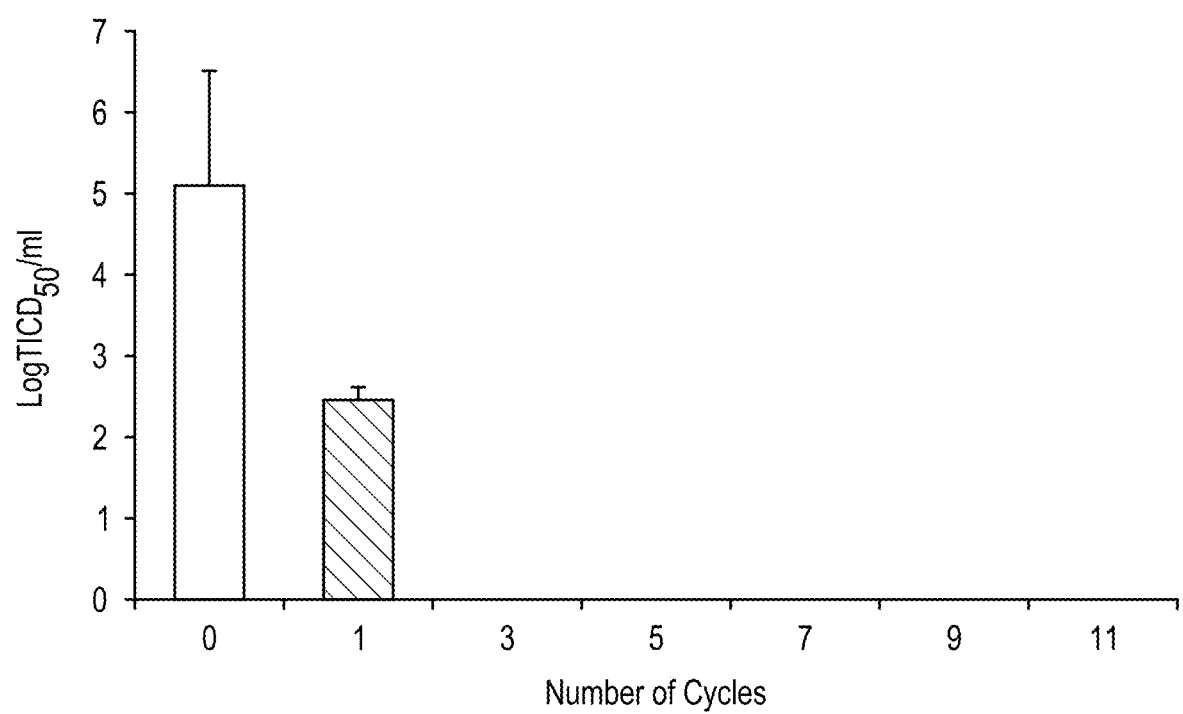
Figure 7:
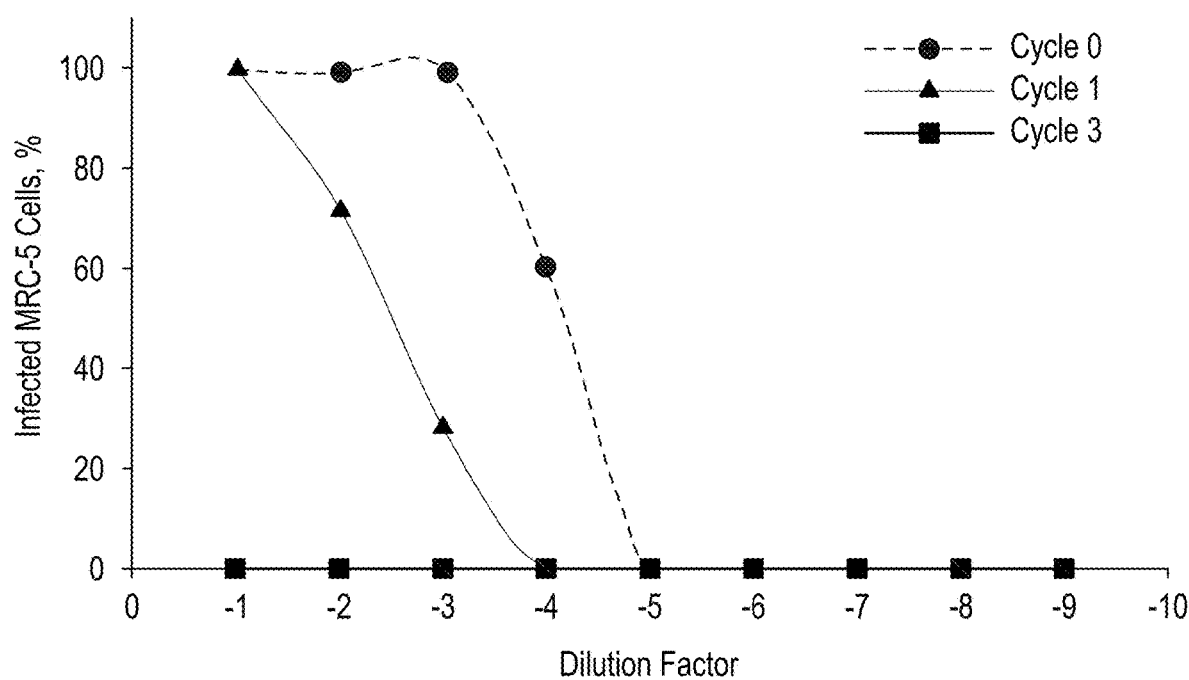
Figure 8:
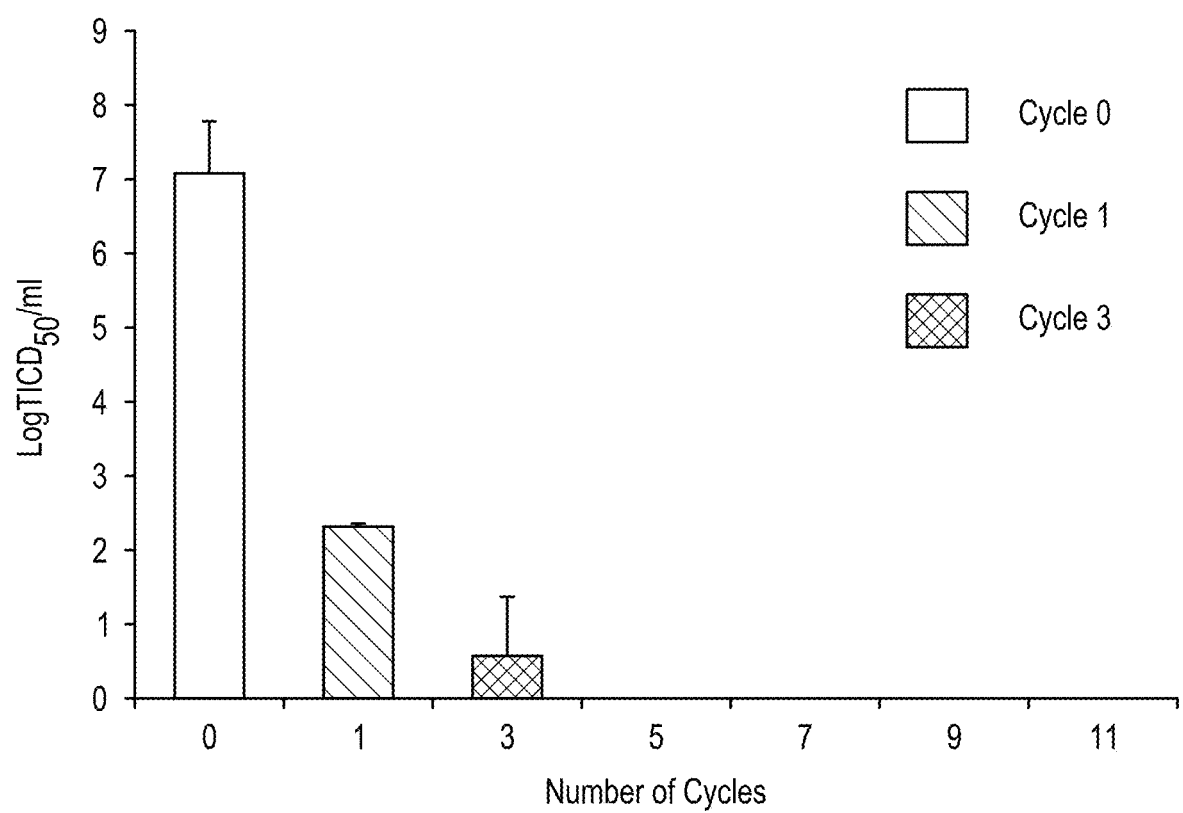
Figure 9:
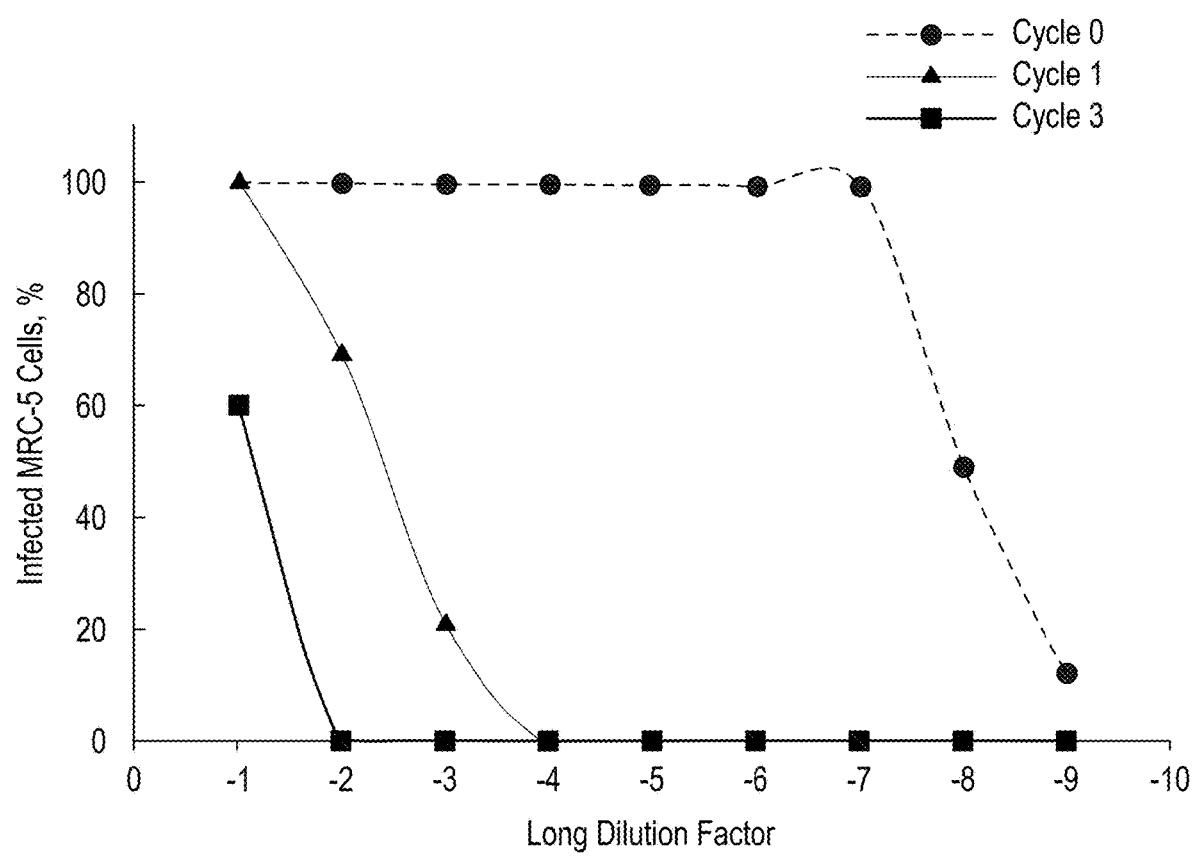
Figure 10:
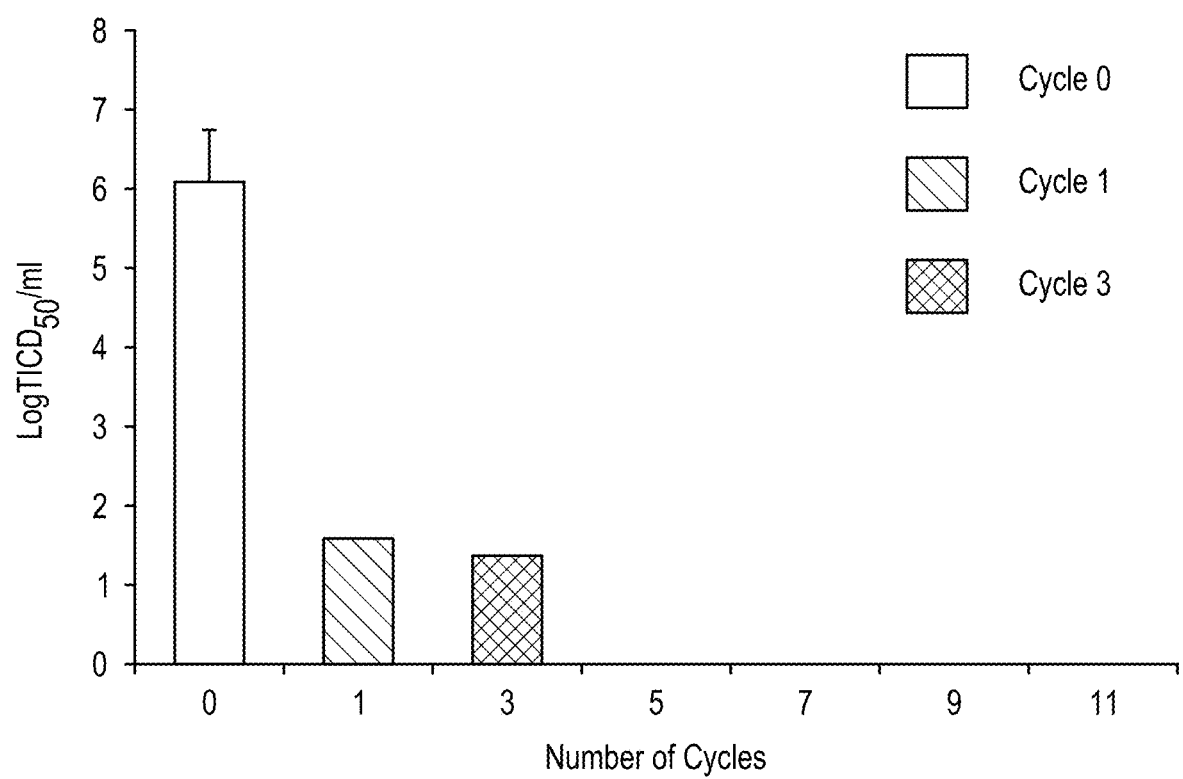
Figure 11:
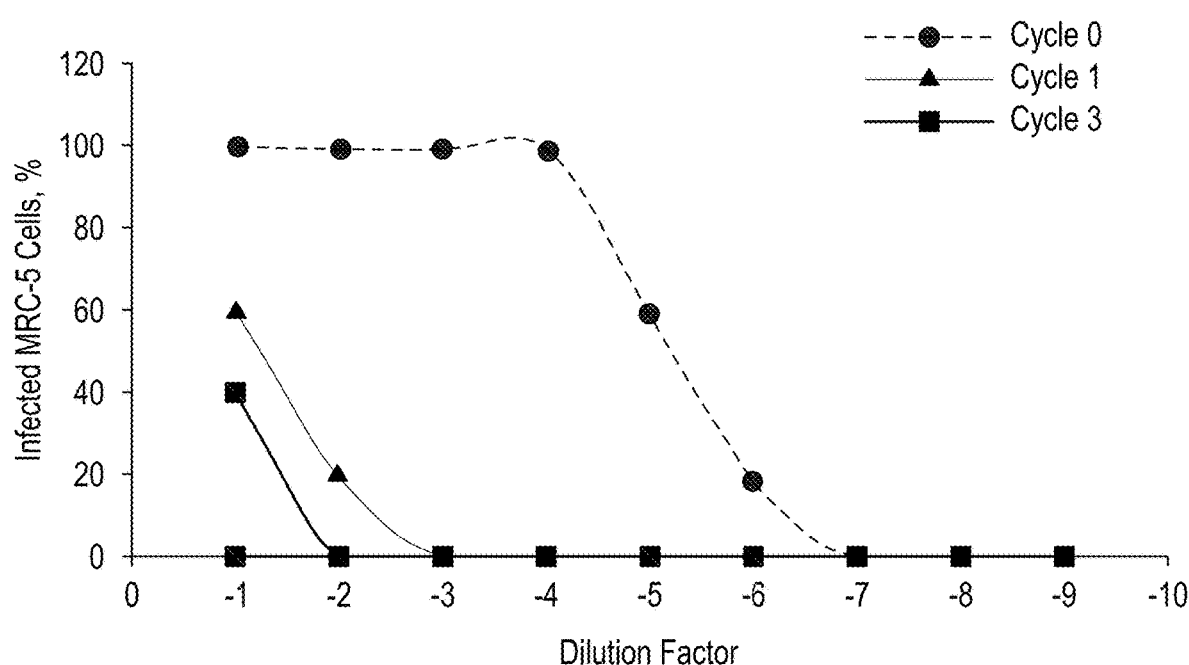
Figure 12:
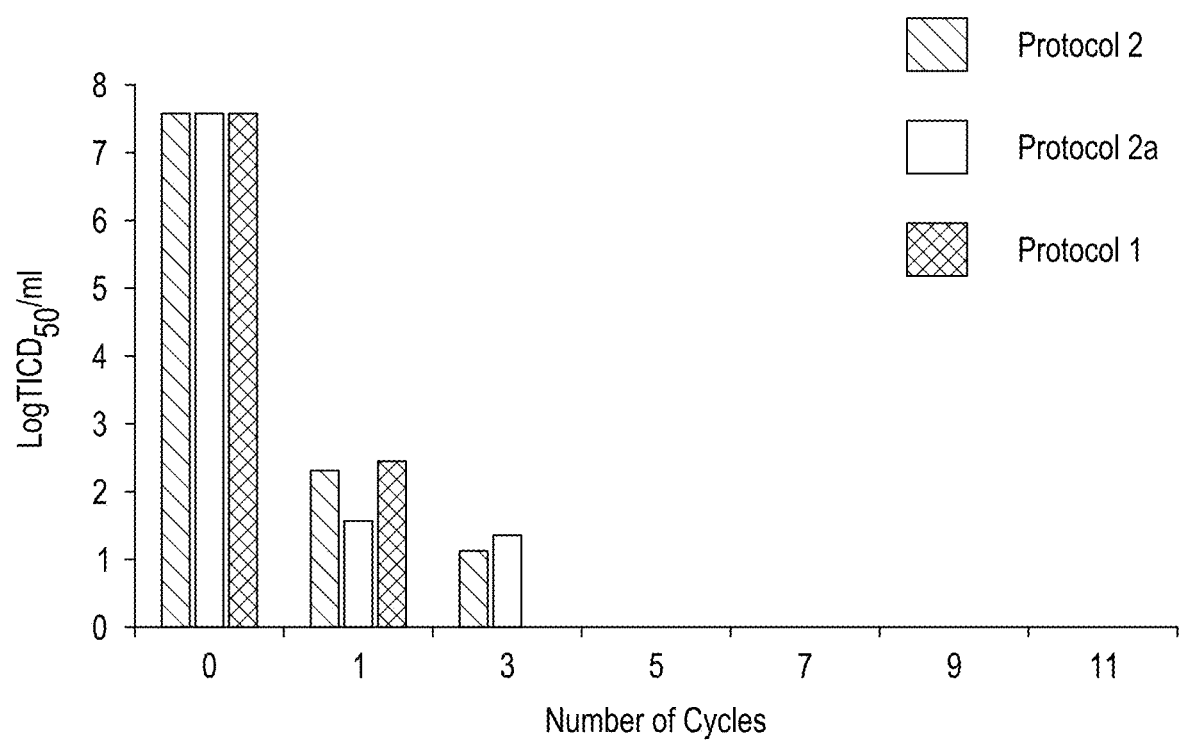
Figure 13A:
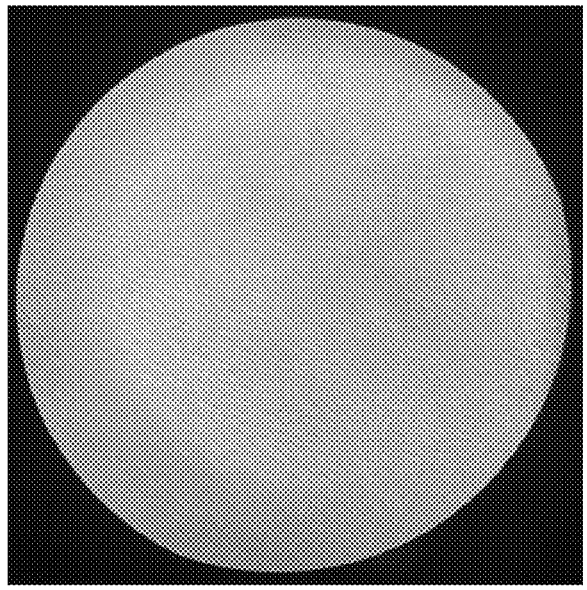
Figure 13B:
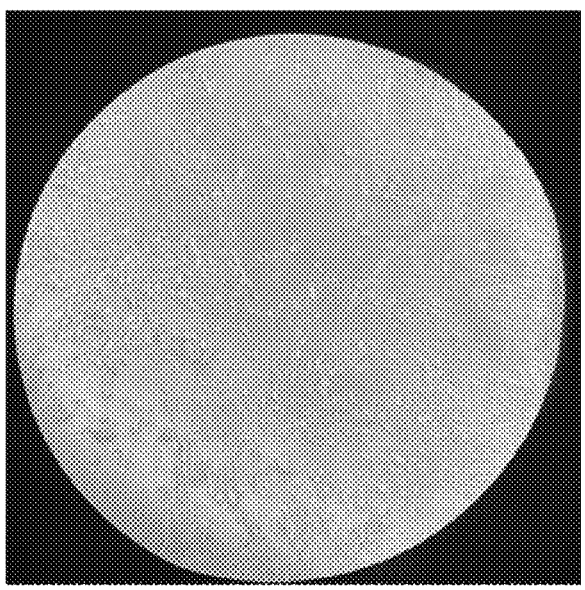
Figure 13C:
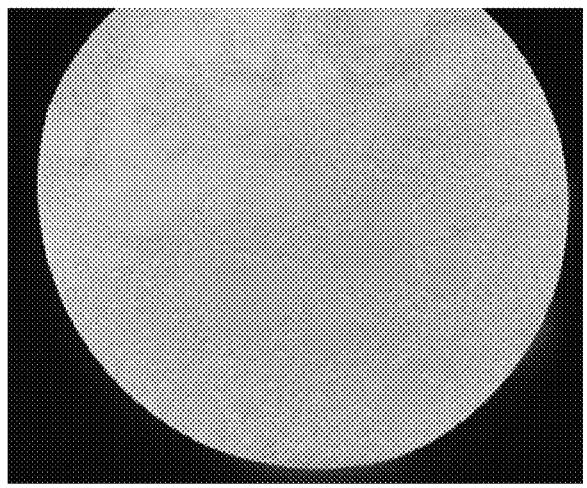
Figure 13D:
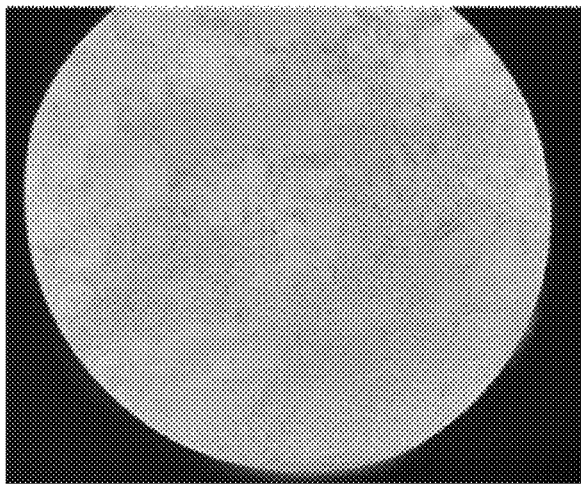

Effect of Protocol 1 on HCoV-229E $TCID_{50}$ assay was performed in order to investigate any infectivity of HCoV-229E after each cycle of the treatment following protocol 1. FIGS. 6 and 7 show the effect of protocol 1 on viral activity. As seen in FIG. 6, no CPE was observed after 1 cycle, whereas $TCID_{50}$ was reduced from 5.1 log $TCID_{50}$ to 2.5 log $TCID_{50}$ after the first cycle. Control is considered as "0 cycles". Data showed represent the mean of two independent experiments with error bars of standard deviation. Control (0 cycles) was compared to cycle one with P-value >0.05.

CPE in MRC-5 cells was still detected in $10^{-1}$ (log dilution factor −1) diluted viral suspension after cycle 1, but percentages of infected cells reduced to 71% and 28% in $10^{-4}$ and $10^{-5}$ dilutions, respectively (FIG. 7—Log dilution factor represents number of serial dilution as described herein). This means that UVA and UVC exposure resulted in the inactivation of HCoV-229E after one cycle in concentrations lower than 1:10 dilutions. In addition, no CPE was observed after 5, 6, 7 and 9 cycles.

Effect of Protocol 2 on HCoV-229E

Protocol 2 was used for inactivation of HCoV-229E for up to 11 cycles. Data showed represent the mean of two independent experiments with error bars of standard deviation. Control (0 cycles) was significantly different to cycle 1 and cycle 3 (P-value <0.01), respectively. FIG. 8 shows the effect of each cycle on the ability of HCoV-229E to infect at least 50% of MRC-5 cells. $TCID_{50}$ at 0 cycles was considered as the control and corresponded to 7.57 log $TCID_{50}$. As shown in FIG. 8, log $TCID_{50}$ was reduced to 2.34 and 1.16 after the first and third cycle, respectively. No CPE was observed after 5, 6, 7 and 9 cycles.

The percentage of infected MRC-5 cells was calculated with results presented in FIG. 9. Log dilution factor represents number of serial dilution as described herein.

As shown in FIG. 9, the percentage of MRC-5 cells infected with HCoV-229E after a single cycle reduced from 100% to 0% at $10^{-4}$ serial dilution. After 3 cycles, the concentration that infected around 60% of MRC-5 cells was dramatically decreased from $10^{-8}$ to $10^{-1}$ viral stock dilution.

The data obtained so far is in agreement with other research studies, where HCoV-229E was subject to UVC and UVA radiation. It has been found that UVA decreased HCoV-229E spike protein, which helps virus to bind to a cellular membrane [R. A, G. G. S. Leite, G. Y. Melmed, R. Mathur, M. J. Villanueva-Millan and e. al., "Ultraviolet A light effectively reduces bacteria and viruses including coronavirus," *PLOS ONE, vol.* 15, pp. 1-5, 2020].

Effect of Protocol 2a on HCoV-229E $TCID_{50}$ assay was also used in order to investigate any infectivity of HCoV-229E after each cycle of the treatment following protocol 2a. FIGS. 10 and 11 show the effect of UV lamp on CPE caused by HCoV-229E after 11 cycles. As illustrated in FIG. 10, $TCID_{50}$ significantly reduced from 6.1 log $TCID_{50}$ to 1.6 and 1.4 log $TCID_{50}$ after 1 and 3 cycles, respectively. No CPE was observed after 3 cycles.

As best seen in FIG. 10, there is shown the effect of UVA and UVC light on infectivity of HCoV-229E in 96-well plate. The virus was treated with UV following the protocol 2. Control is considered as "0 cycles". Data showed represent the mean of two independent experiments with error bars of standard deviation. Control (0 cycles) was compared to cycle 1 and 3 with P-values being <0.05 respectively.

FIG. 11 represents percentage of infected cells, which dropped from 100% to 60% and 40% at dilution $10^{-1}$ after 1 and 3 cycles, respectively.

As best seen in FIG. 11, there is shown the percentage of infected MRC-5 cells after 0, 1 and 3 cycles in 96-well plate. Log dilution factor represents number of serial dilution as described herein.

Comparison of Different Protocols Used

The effect of different protocols on infectivity of the virus could be compared. FIG. 12 shows the comparison of protocol 1, 2 and 2a after 11 cycles, respectively, on infectivity of HCoV-229E in 96-well plate. Control is considered as "0 cycles". As seen in FIG. 12, $TCID_{50}$ reduced from the control to 1.6 log after 1 cycle using protocol B2. $TCID_{50}$ was 2.34 and 2.5 log after 1 cycle using protocols 1 and 2, respectively. However, there was no CPE detected after 3 cycles using protocol 1, whereas $TCID_{50}$ was reduced to 1.6 and 1.4 log by protocols 2 and 2a, respectively. This means that protocol 1 might be the most successful setting in order to inactivate HCoV-229E after 3 cycles. As protocols 2 and 2a differed by the duration of UVC, the longer UVC treatment (20 seconds for protocol 2a) showed a slight change in $TCID_{50}$ from 2.34 to 1.6 log.

FIGS. 13A-13D illustrates MRC-5 cells at different conditions: non-infected (FIG. 13A), infected, but not treated (FIG. 13B), infected and treated for 1 cycle (FIG. 13C) and infected and treated for 3 cycles (FIG. 13D). Images showing MRC-5 cells at different experimental stages: non-infected control (FIG. 13A), infected cells with HCoV-229E before UV treatment (FIG. 13B), infected cells after 1 cycle of UV treatment (FIG. 13C) and infected cells after 3 cycles of UV treatment (FIG. 13D) using protocol 2a. According to FIGS. 13A-13D, cells appeared rounded upon the infection, which was referred to CPE. There were a small number of alive cells remained after cycle 1, whereas cells could likely be dead by the end of cycle 3. It has been discovered elsewhere that many enveloped viruses including SARS-CoV-2 and HCoV-229E might not remain viable for a long time once they left either liquid medium or host that are necessary for their replication [C. S. Heilingloh, U. W. Aufderhost, L. Schipper, U. Dittmer, O. Witzke, D. Yang, X. Zheng, K. Sutter, M. Trilling, M. Alt, E. Steinmann and A. Krawczyk, "Susceptibility of SARS-CoV-2 to UV irradiation," *American Journal* of Infection Control, vol. 48, pp. 1273-1275, 2020].

FIGS. 14 and 15 represent effect of different protocols on $TCID_{50}$ of MRC-5 cells after 1 cycle in 24-well plates. According to FIGS. 14 and 15, the effect of protocols on CPE caused by HCoV-229E in 24-well plates was similar to 96-well plates.

FIG. 14 depicts the effect of protocol 1, 2 and 2a on infectivity of HCoV-229E in 24-well plate. Control is considered as "0 cycles". Data shown represent mean of two independent experiments with error bars of standard deviation. Control was compared to treatments with P-values being <0.5, >0.1 and <0.01 for protocol 1, 2 and 2a, respectively.

FIG. 15 depicts the effect of protocol 1, 2 and 2a on infectivity of HCoV-229E in 24-well plate. Control is considered as "0 cycles".

Cross-Contamination

The exponential model was used to calculate the impact of UV on approximately 3.5 PFU/ml, 3.34 PFU/ml, 2.28 PFU/ml concentration of virus (PFU=0.7TCID$_{50}$) using protocol 1, 2 and 2a, respectively. Using a value of k=2.92 [T. Watanabe, T. A. Bertrand, M. H. Weir, T. Omura and C. N. Haas, "Development of a dose-response model for SARS coronavirus," *Risk Anal, vol.* 30, pp. 1129-1138, 2010], the pulsing programme with the UVA and UVC results in exponential risk p=0.7, 0.68 and 0.42 for protocol 1, 2 and 2a that might represent 30%, 32% and 58% decrease in cross contamination risk for MRC-5 cells after one cycle.

Diseases associated with coronaviruses are a major worldwide concern and might be fatal. There are different ways of spreading viral particles such as through air droplets or via touching contaminated surfaces. It was found that pathogenic HCoV-229E could be infectious in a human lung cell culture such as MRC-5 for at least 5 days as well as on nonbiocidal surface materials: polytetrafluoroethylene, glass, polyvinyl chloride (PVC), silicone rubber, ceramic tiles and stainless steel [C. S. Heilingloh, U. W. Aufderhost, L. Schipper, U. Dittmer, O. Witzke, D. Yang, X. Zheng, K. Sutter, M. Trilling, M. Alt, E. Steinmann and A. Krawczyk, "Susceptibility of SARS-CoV-2 to UV irradiation," *American Journal of Infection Control*, vol. 48, pp. 1273-1275, 2020]. Furthermore, SARS-CoV-2 may be still infectious on surfaces such as on plastic surface for 3-4 days at a room temperature, SARS-CoV-1 can survive on the surface of polystyrene petri dish for at least 6 days at room temperature, but loss it's activity after 9 days [M. E. R. Darnell, K. Subbarao, S. M. Feinstone and D. R. Taylor, "Inactivation of the coronavirus that induces severe acute respiratory syndrome, SARS-CoV," *J Virol Methods, vol.* 121, pp. 85-91, 2004]. However, infectivity of coronaviruses on surfaces depends on not only on a type of surface, but also on both temperature and humidity. It was observed that MERS-CoV and HCoV-229E possessed shorter survivability at room temperature compared to SARS-CoV-1 and SARS-CoV-2 on plastic, whereas HCoV-229E has found to have a longer persistence on both polytetrafluoroethylene (Teflon), glass, ceramic and polyvinyl chloride (PVC) for up to 5 days [M. E. R. Darnell, K. Subbarao, S. M. Feinstone and D. R. Taylor, "Inactivation of the coronavirus that induces severe acute respiratory syndrome, SARS-CoV," *J Virol Methods, vol.* 121, pp. 85-91, 2004]. The infectivity of SARS-CoV-1 and SARS-CoV-2 on glass was limited to 2 and 4 days, respectively [M. E. R. Darnell, K. Subbarao, S. M. Feinstone and D. R. Taylor, "Inactivation of the coronavirus that induces severe acute respiratory syndrome, SARS-CoV," *J Virol Methods, vol.* 121, pp. 85-91, 2004]. SARS-CoV-1 and HCoV-229E were detectable in dechlorinated tap water for 3 and 6 days, respectively [M. E. R. Darnell, K. Subbarao, S. M. Feinstone and D. R. Taylor, "Inactivation of the coronavirus that induces severe acute respiratory syndrome, SARS-CoV," *J Virol Methods, vol.* 121, pp. 85-91, 2004]. This means that in order to stop spreading of diseases associated with coronaviruses, commonly touched surfaces should be decontaminated. One of the ways to decontaminate such surfaces could be use of different types of UV lamps.

Each strain of coronavirus might possess different sensitivity to UV. For instance, it has been reported elsewhere that far-UVC can eliminate beta HCoV-OC43 virus in 8 minutes (~90% viral inactivation), in ~11 minutes (95%), ~16 minutes (99%) or ~25 minutes (99.9%) [M. Buonanno, D. Welch, I. Shuryak and J. D. Brenner, "Far-UVC light (222 nm) efficiently and safely inactivates airborne human coronaviruses," *Scientific Reports*, vol. 10, pp. 1-3, 2020]. Another study discovered that 1,048 mJ/cm$^2$ of UVC for 9 minutes is enough to inactivate 5×106 TCID$_{50}$/ml of SARS-CoV-2 [S. L. Warnes, Z. R. Little and W. C. Keevil, "Human Coronavirus 229E Remains Infectious on Common Touch Surface Materials," *American Society of Microbiology*, vol. 6, 2015]. Moreover, exposure of SARS-CoV-2 to 1 and 3 mJ/cm$^2$ of 222-nm UVC could result in 88.5 and 99.7% viral reduction [. A. Aboubakr, T. A. Sharafeldin and S. M. Goyal, "Stability of SARS-CoV-2 and other coronaviruses in the environment and on common touch surfaces and the influence of climatic conditions: A review," *Transbound Emerg Dis.*, pp. 1-17, 2020]. UVA was also used for viral inactivation. It was observed that UVA (540 µW/cm$^2$ at a distance of 3 cm) demonstrated weak inactivation of SARS-CoV-2 after 15 minutes, but UVC (1940 µW/cm$^2$) in a 400-fold decrease in infectious virus after 6 minutes [M. Bueckert, R. Gupta, A. Gupta, M. Garg and A. Mazumder, "Infectivity of SARS-CoV-2 and Other Coronaviruses on Dry Surfaces: Potential for Indirect Transmission," *Materials*, vol. 13, pp. 1-16, 2020], [S. L. Warnes, Z. R. Little and W. C. Keevil, "Human Coronavirus 229E Remains Infectious on Common Touch Surface Materials," *American Society of Microbiology*, vol. 6, 2015]. Another study found a one-log titre reduction of SARS-CoV-2 after 9 minutes of UVA exposure (365 nm) [C. S. Heilingloh, U. W. Aufderhost, L. Schipper, U. Dittmer, O. Witzke, D. Yang, X. Zheng, K. Sutter, M. Trilling, M. Alt, E. Steinmann and A. Krawczyk, "Susceptibility of SARS-CoV-2 to UV irradiation," *American Journal of Infection Control*, vol. 48, pp. 1273-1275, 2020]. Moreover, it was reported that UVA significantly affected single-stranded RNA viruses such as HCoV-229E spike proteins without major damage to human cells [R. A, G. G. S. Leite, G. Y. Melmed, R. Mathur, M. J. Villanueva-Millan and e. al., "Ultraviolet A light effectively reduces bacteria and viruses including coronavirus," *PLOS ONE*, vol. 15, pp. 1-5, 2020].

Different effects of UVC and UVA on coronaviruses could be explained by mechanisms of light absorption. UVA light may be weakly absorbed by RNA and DNA and subsequently could be less effective in inducing pyrimidine dimers than either UVC or UVB. However, UVA was found to cause additional genetic damage via production of reactive oxygen species that lead to oxidation of bases and strand breaks [M. Bueckert, R. Gupta, A. Gupta, M. Garg and A. Mazumder, "Infectivity of SARS-CoV-2 and Other Coronaviruses on Dry Surfaces: Potential for Indirect Transmission," *Materials, vol.* 13, pp. 1-16, 2020], [R. A, G. G. S. Leite, G. Y. Melmed, R. Mathur, M. J. Villanueva-Millan and e. al., "Ultraviolet A light effectively reduces bacteria and viruses including coronavirus," *PLOS ONE, vol.* 15, pp. 1-5, 2020].

Effect of UVA and UVC on infectivity of HCoV-229E strain was analysed using MRC-5 cell line. UVA and UVC were engaged using three different protocols. The infectious dose of HCoV-229E was detected using TCID$_{50}$ assay using protocols 1, 2 and 2a. The results showed that TCID$_{50}$ of HCoV-229E reduced from 7.57 log TCID$_{50}$ of the control 2.34, 2.5 and 1.6 log TCID$_{50}$ using protocols 1, 2 and 2a after the first cycle, respectively. No CPE was observed after 5, 6, 7 and 9 cycles.

In addition, the results from the exponential model calculations showed that one cycle of protocol 1, 2 and 2a reduced cross-contamination of MRC-5 cells to 32%, 30% and 58%, respectively.

As many changes can be made to the preferred embodiment of the disclosure without departing from the scope thereof; it is intended that all matter contained herein be considered illustrative and not in a limiting sense.

The invention claimed is:

1. A UVA/UVC system for reducing levels, on a surface, and inhibiting further growth of human coronavirus on said surface, wherein said system has no deleterious effects on a human eye, epidermis and dermis, wherein said system comprises:
   i) an inanimate surface;
   ii) at least one UVA light source;
   iii) at least one UVC light source; and
   iv) at least one controller connected to each of said at least one UVA light source and said at least one UVC light source, for controlling at least one parameter of each of said UVA light source and UVC light source selected from light source, light intensity, radiated power level, wavelength, exposure time and combinations thereof; wherein said at least one UVC light source emits UVC light to said inanimate surface for a period of time reducing the level of said human coronavirus on said inanimate surface to a level that is safe for humans, and said at least one UVA light source emits UVA light to said inanimate surface for a period of time inhibiting growth of said human coronavirus on said inanimate surface, such that during the time said at least one UVC light source and said at least one UVA light source is emitting on said inanimate surface, radiation levels from said at least one UVC light source and said at least one UVA light source is safe to humans; wherein when said at least one UVC light source is emitting UVA light to said inanimate surface, said at least one UVC light is off, and when said at least one UVA light source is emitting light to said inanimate surface, said at least one UVC light source is off; wherein cycling between said at least one UVC light source and said at least one UVA light source is controlled by said at least one controller; wherein said at least one UVA light source has an operating wavelength of from about 385 nanometers (nm) to about 400 nm and a power rating of from about 10 milliwatts (mW) to about 100 watts (W); and said at least one UVC light source has an operating wavelength of from about 275 nm to about 295 nm and a power rating from about 10 mW to about 100 W, wherein said UVA power rating remains constant during the exposure time inhibiting growth of said human coronavirus on said surface and said UVC power rating remains constant during the exposure time reducing the level of said human coronavirus on said surface, and said exposure time of emitting each of said i) UVA light source; ii) said UVC light source, and iii) a determined period of blanking time wherein both said UVA light source and said UVC light source are off, before recommencing the cycle of UVC and UVA light exposure onto said inanimate surface, is regulated on and/or off based solely on time.

2. The system of claim 1, wherein said at least one UVC light source has an operating wavelength of about 275 nanometers (nm).

3. The system of claim 1, wherein said at least one UVC light source has an operating wavelength of about 274 nm.

4. The system of claim 1, wherein said at least one UVA light source has an operating wavelength of about 4005 nm.

5. The system of any one of claim 1, wherein said at least one UVC light source is a light emitting diode (LED).

6. The system of any one of claim 1, wherein said at least one UVA light source is a LED.

7. The system of claim 1, wherein the at least one controller automatically cycles between emitting light from said at least one UVA light source and from said at least one UVC light source.

8. The system of claim 1, wherein said at least one UVC light source has an emission at a power level and time duration to reduce a human coronavirus on a surface exposed to said at least one UVC light source.

9. The system of claim 1, wherein the power level is selected to ensure the radiated emission from said at least one UVC light source is at a safe level for human eyes.

10. The system of claim 1, wherein the time duration is selected to ensure the radiated emission from said at least one UVC light source is at a safe exposure time for human eyes.

11. The system of claim 1, wherein said at least one UVA light source has an emission at a power level to inhibit growth of human coronavirus on a surface previously exposed to said at least one UVC light source reducing the level of said human coronavirus on said surface, wherein said at least one UVA light source is safe for human eyes, regardless of the exposure time.

12. The system of claim 1, wherein said at least one UVC light source has a power rating of from about 10 mW to about 100 W.

13. The system of claim 12, wherein said at least one UVC light source has a power rating of 236 mW.

14. The system of claim 1, wherein said at least one UVA light source has a power rating of from about 10 mW to about 100 W.

15. The system of claim 14, wherein said at least one UVA light source has a power rating of 74 mW.

16. The system of claim 1, wherein said system reduces the level of active human coronavirus on a surface exposed to said system by 1 to 100%.

17. The system of claim 16, wherein said at least one UVC light source and said at least one UVA light source are the same source.

18. The system of claim 14, wherein said at least one UVC light source is on for about 6 seconds, then off and followed immediately by said at least one UVA light source is on for about 6.5 hours, then both said at least one UVC light source and said at least one UVA light source is off for about 1.5 hours before recommencing cycling of said at least one UVC light source and said at least one UVA light source exposure.

19. The system of claim 1, wherein said at least one UVC light source and said at least one UVA light source are the same source.

20. A method of reducing levels, on a surface, and inhibiting further growth of human coronavirus on said surface, wherein said method has no deleterious effects on a human eye, wherein said method comprises:
   i) exposing said surface to at least one UVC light source at a constant power level for a period of time to reduce the level of said human coronavirus on said surface;
   ii) terminating the exposure of the at least one UVC light source on said surface;
   iii) exposing said UVC exposed surface to at least one UVA light source at a constant power level for a period of time to inhibit growth of said human coronavirus on said surface;
   iv) terminating the exposure of the at least one UVA light source on said surface;
   v) providing a period of time wherein said at least one UVA light source and said at least one UVC light source are off; and vi) optionally repeating steps i) to v) in order to maintain a desired level of inactive human coronavirus on said surface; wherein said period of time to reduce the level of said human coronavirus on said surface, said period of time to inhibit growth of said human coronavirus on said surface and said period of time wherein said at least one UVA light source and said at least one UVC light source are off are regulated solely by time.

21. The method of claim 20, wherein said at least one UVC light source has an operating wavelength of about 275 to about 295 nanometers (nm).

22. The method of claim 21, wherein said at least one UVC light source has an operating wavelength of about 275 nm.

23. The method of claim 20, wherein said at least one UVA light source has an operating wavelength of about 405 nm.

24. The method of claim 20, wherein said at least one UVA light source has an operating wavelength of about 4005 nm.

25. The method of claim 20, wherein said at least one UVC light source is a light emitting diode (LED).

26. The method of claim 20, wherein said at least one UVA light source is a LED.

27. The method of claim 20, wherein steps i) to v) are controlled by at least one controller automatically cycling between emitting light from said at least one UVA light source and from said at least one UVC light source.

28. The method of claim 20, wherein said at least one UVC light source has an emission at a power level and time duration to reduce at least one pathogen on a surface exposed to said at least one UVC light source.

29. The method of claim 20, wherein the power level is selected to ensure the radiated emission from said at least one UVC light source is at a safe level for human eyes.

30. The method of claim 20, wherein the time duration is selected to ensure the radiated emission from said at least one UVC light source is at a safe exposure time for human eyes.

31. The method of claim 20, wherein said at least one UVA light source has an emission at a power level to inhibit growth of human coronavirus on a surface exposed to said at least one UVC light source, wherein said at least one UVA light source power rating is chosen so that exposure is safe for human eyes, regardless of the exposure time.

32. The method of claim 20, wherein said at least one UVC light source has a power rating of from about 10 mW to about 100 W.

33. The method of claim 32, wherein said at least one UVC light source has a power rating of 236 mW.

34. The method of claim 20, wherein said at least one UVA light source has a power rating of from about 10 mW to about 100 W.

35. The method of claim 34, wherein said at least one UVA light source has a power rating of 47 mW.

36. The method of claim 20, wherein said method reduces the level of active human coronavirus on a surface by 1 to 100%.

37. The method of claim 36 wherein said level is reduced by 10 to 20%.

38. The method of claim 37, wherein said at least one UVC light source and said at least one UVA light source are the same source.

39. The method of claim 20, further comprising an on/off controller to turn off both said at least one UVC light source and said at least one UVA light source for a determined period of blanking time before recommencing the cycle of UVC and UVA light exposure.

40. The method of claim 39, wherein said at least one UVC light source is on for about 6 seconds, then off and followed immediately by UVA on for about 6.5 hours, then both said at least one UVC light source and said at least one UVA light source off for about 1.5 hours before recommencing cycling of UVC and UVA light source exposure.

41. The method of claim 20, wherein said at least one UVC light source and said at least one UVA light source are the same source.

* * * * *